(12) United States Patent
Mondal et al.

(10) Patent No.: US 10,516,461 B2
(45) Date of Patent: Dec. 24, 2019

(54) BEAM MANAGEMENT FOR DUAL TRANSMISSION POINT HYBRID BEAMFORMING SYSTEMS IN 5G

(71) Applicant: Intel IP Corporation, Santa Clara, CA (US)

(72) Inventors: Bishwarup Mondal, San Jose, CA (US); Shirish Nagaraj, Pleasanton, CA (US); Ajit Nimbalker, Fremont, CA (US); Yushu Zhang, Beijing (CN); Gang Xiong, Beaverton, OR (US); Jong-Kae Fwu, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/081,787

(22) PCT Filed: Sep. 28, 2016

(86) PCT No.: PCT/US2016/054086
§ 371 (c)(1),
(2) Date: Aug. 31, 2018

(87) PCT Pub. No.: WO2017/164933
PCT Pub. Date: Sep. 28, 2017

(65) Prior Publication Data
US 2019/0089435 A1    Mar. 21, 2019

Related U.S. Application Data

(60) Provisional application No. 62/311,145, filed on Mar. 21, 2016, provisional application No. 62/311,171, (Continued)

(51) Int. Cl.
*H04K 1/10*    (2006.01)
*H04L 27/28*    (2006.01)
(Continued)

(52) U.S. Cl.
CPC ........... *H04B 7/0626* (2013.01); *H04B 7/026* (2013.01); *H04B 7/0408* (2013.01);
(Continued)

(58) Field of Classification Search
CPC .. H04B 7/0626; H04B 7/0695; H04B 7/0408; H04B 7/088; H04B 17/318; H04B 7/026; H04W 72/0473; H04W 72/042
(Continued)

(56) References Cited

U.S. PATENT DOCUMENTS

| | | |
|---|---|---|
| 8,781,512 B1 | 7/2014 | Grochla et al. |
| 2013/0286960 A1* | 10/2013 | Li ...................... H04W 72/042 370/329 |

FOREIGN PATENT DOCUMENTS

| | | |
|---|---|---|
| TW | 201735560 A | 10/2017 |
| WO | WO-2015088419 A1 | 6/2015 |
| WO | WO-2015147717 A1 | 10/2015 |

OTHER PUBLICATIONS

"Beamformed CSI-RS design for CSI reporting class B", R1-157053, 3GPP TSG RAN WG1 Meeting #83, (Nov. 7, 2015).
(Continued)

*Primary Examiner* — Phuong Phu
(74) *Attorney, Agent, or Firm* — Schwegman Lundberg & Woessner, P.A.

(57) ABSTRACT

Devices and methods of beamforming are generally described. A UE transmits to an eNB a BRSRP report having selected BRSRP values and associated BRS IDs. An active link list, a CSI resource indication, and a first active link are used to measure the CSI resource and CSI feedback is sent. A serving link ID is provided to indicate a second active link to use for control and data reception. Rx beams are trained based on multiple instances of each BRS and the eNB supplies selection criteria for the BRSRP report. The Rx
(Continued)

beams are refined based on BRRS and the second active link is dependent on BRRSRP or CSI feedback. When configured for dual beam operation, the BRSRP feedback corresponds to BRSRP value pairs and dual Rx beams associated with a pair of serving link IDs are used.

31 Claims, 9 Drawing Sheets

Related U.S. Application Data filed on Mar. 21, 2016, provisional application No. 62/314,243, filed on Mar. 28, 2016.

(51) Int. Cl.
*H04B 7/06* (2006.01)
*H04B 17/318* (2015.01)
*H04B 7/026* (2017.01)
*H04B 7/0408* (2017.01)
*H04B 7/08* (2006.01)
*H04W 72/04* (2009.01)

(52) U.S. Cl.
CPC .......... *H04B 7/0695* (2013.01); *H04B 7/088* (2013.01); *H04B 17/318* (2015.01); *H04W 72/0473* (2013.01)

(58) Field of Classification Search
USPC .......................... 375/260, 267, 299, 346, 347
See application file for complete search history.

(56) References Cited

OTHER PUBLICATIONS

"CSI feedback Enhancement for Elevation Beamforming/FD-MIMO", R1-150300 3GPP TSG RAN WG1 Meeting #80, (Feb. 18, 2015).
"International Application Serial No. PCT/US2016/054086, International Search Report dated Jan. 3, 2017", 3 pgs.
"International Application Serial No. PCT/US2016/054086, Written Opinion dated Jan. 3, 2017", 6 pgs.

* cited by examiner

BEAM MANAGEMENT FOR DUAL TRANSMISSION POINT HYBRID BEAMFORMING SYSTEMS IN 5G

PRIORITY CLAIM

This application is a U.S. National Stage Filing under 35 U.S.C. 371 from International Application No. PCT/US2016/054086, filed Sep. 28, 2016 and published in English as WO 2017/164933 on Sep. 28, 2017, which claims the benefit of priority to U.S. Provisional Patent Application Serial No. 62/311,145, filed Mar. 21, 2016, and entitled "BRS BASED ACTIVE BEAM MANAGEMENT FOR HYBRID BEAMFORMING SYSTEMS IN 5G," U.S. Provisional Patent Application Serial No. 62/311,171, filed Mar. 21, 2016, and entitled "BRRS BASED ACTIVE BEAM MANAGEMENT FOR HYBRID BEAMFORMING SYSTEMS IN 5G," U.S. Provisional Patent Application Serial No. 62/314,243, filed Mar. 28, 2016, and entitled "BEAM MANAGEMENT FOR DUAL TP HYBRID BEAMFORMING SYSTEMS IN 5G," each of which is incorporated herein by reference in its entirety.

TECHNICAL FIELD

Embodiments pertain to radio access networks. Some embodiments relate to hybrid beamforming in cellular networks, including Third Generation Partnership Project Long Term Evolution (3GPP LFE) networks and LTE advanced (LTE-A) networks as well as $4^{th}$ generation (4G) networks and $5^{th}$ generation (5G) networks.

BACKGROUND

The use of 3GPP LTE systems (including LTE and LTE-Advanced systems) has increased due to both an increase in the types of devices user equipment (UEs) using network resources as well as the amount of data and bandwidth being used by various applications, such as video streaming, operating on these UEs. As a result, 3GPP LIE systems continue to develop, with the next generation wireless communication system, 5G, to improve access to information and data sharing. 5G looks to provide a unified network/system that is able to meet vastly different and sometime conflicting performance dimensions and services driven by disparate services and applications while maintaining compatibility with legacy UEs and applications.

Various techniques continue to be developed to increase the amount of data able to be conveyed between an evolved NodeB (eNB) and UEs. In particular, the recent expansion of communications into mmWave and unlicensed spectrum bands has enabled the use of carrier aggregation (CA) in increasing the amount of data by increasing the data rate and/or the number of UEs serviced by the eNB. However, one of the issues with the use of mmWave bands is that the pathloss for such frequencies (in the range of 30 GHz) is extremely high compared with previously employed frequencies (3GHz or less). This may also increase interference caused by the multipath and fading effects. To combat this, a large antenna array may be used to increase the array gain and/or beamforming may be used. While channel rank may be used to distinguish among the beams, in certain circumstances, the number of transmit antennae may be smaller than the maximum number of supportable streams. This issue may be aggravated with the use of Cooperative Multipoint (CoMP) transmissions to increase communication coverage. It may be desirable to enhance hybrid beamforming in CoMP systems, especially in dual transmission point (TP) CoMP systems.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
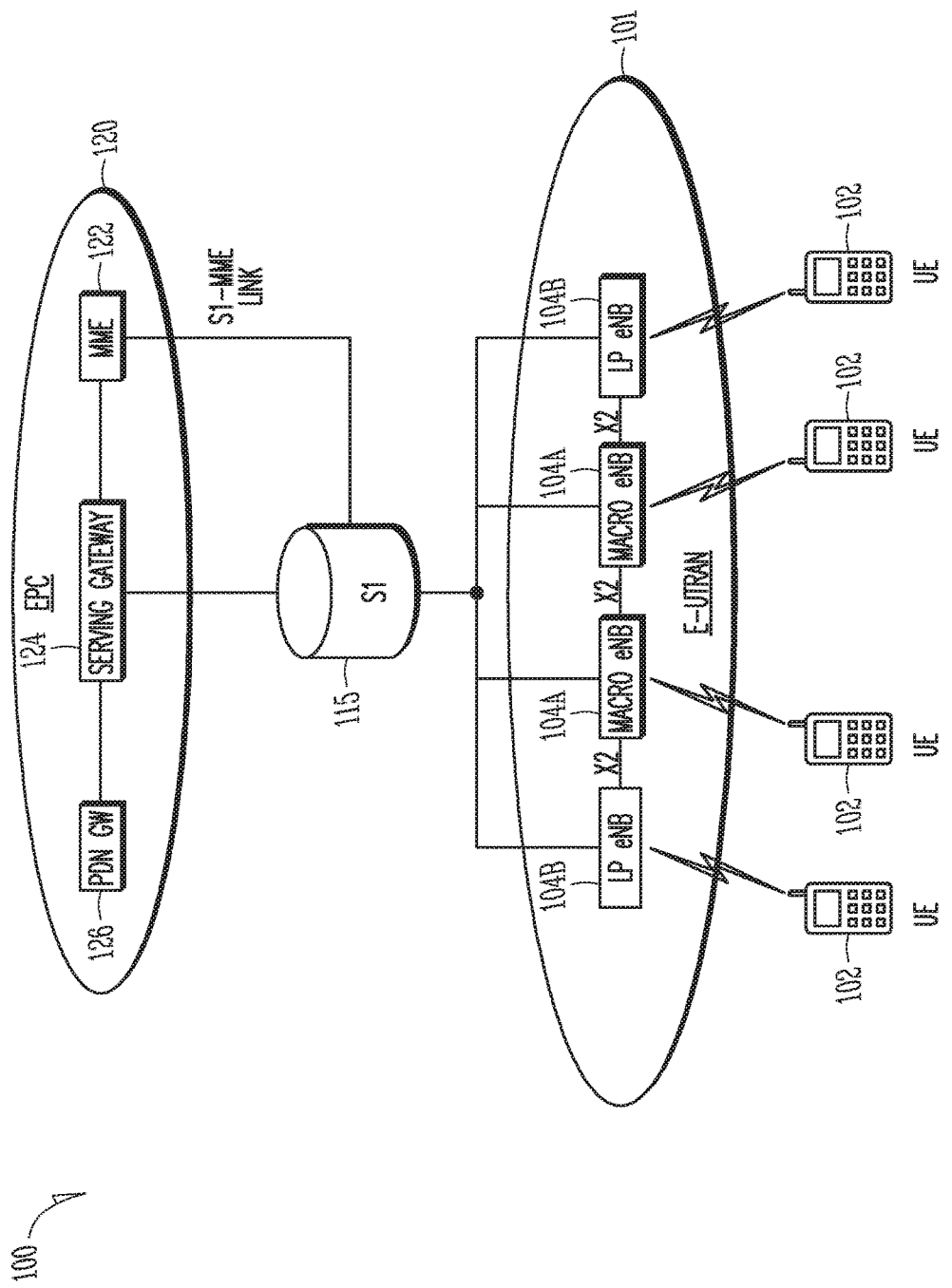
FIG. 1 is a functional diagram of a wireless network in accordance with some embodiments.

FIG. 1 shows an example of a portion of an end-to-end network architecture of a Long Term Evolution (LTE) network with various components of the network in accordance with some embodiments. As used herein, an LTE network refers to both LTE and LTE Advanced (LTE-A) networks as well as other versions of LTE networks to be developed. The network 100 may comprise a radio access network (RAN) (e.g., as depicted, the E-UTRAN or evolved universal terrestrial radio access network) 101 and core network 120 (e.g., shown as an evolved packet core (EPC)) coupled together through an S1 interface 115. For convenience and brevity, only a portion of the core network 120, as well as the RAN 101, is shown in the example.

The core network 120 may include a mobility management entity (MME) 122, serving gateway (serving GW) 124, and packet data network gateway (PDN GW) 126. The RAN

101 may include evolved node Bs (eNBs) 104 (which may operate as base stations) for communicating with user equipment (UE) 102. The eNBs 104 may include macro eNBs 104a and low power (LP) eNBs 104b. The eNBs 104 and UEs 102 may employ the techniques as described herein.

The MME 122 may be similar in function to the control plane of legacy Serving GPRS Support Nodes (SGSN). The MME 122 may manage mobility aspects in access such as gateway selection and tracking area list management. The serving GW 124 may terminate the interface toward the RAN 101, and route data packets between the RAN 101 and the core network 120. In addition, the serving GW 124 may be a local mobility anchor point for inter-eNB handovers and also may provide an anchor for inter-3GPP mobility. Other responsibilities may include lawful intercept, charging, and some policy enforcement. The serving OW 124 and the MME 122 may be implemented in one physical node or separate physical nodes.

The PDN GW 126 may terminate a SGi interface toward the packet data network (PDN). The PDN GW 126 may route data packets between the EPC 120 and the external PDN, and may perform policy enforcement and charging data collection. The PDN GW 126 may also provide an anchor point for mobility devices with non-LTE access. The external PDN can be any kind of IP network, as well as an IP Multimedia Subsystem (IMS) domain. The PDN GW 126 and the serving OW 124 may be implemented in a single physical node or separate physical nodes.

The eNBs 104 (macro and micro) may terminate the air interface protocol and may be the first point of contact for a UE 102. In some embodiments, an eNB 104 may fulfill various logical functions for the RAN 101 including, but not limited to, RNC (radio network controller functions) such as radio bearer management, uplink and downlink dynamic radio resource management and data packet scheduling, and mobility management. In accordance with embodiments, UEs 102 may be configured to communicate orthogonal frequency division multiplexed (OFDM) communication signals with an eNB 104 over a multicarrier communication channel in accordance with an OFDMA communication technique. The OFDM signals may comprise a plurality of orthogonal subcarriers.

The S1 interface 115 may be the interface that separates the RAN 101 and the EPC 120. It may be split into two parts: the S1-U, which may carry traffic data between the eNBs 104 and the serving GW 124, and the S1-MME, which may be a signaling interface between the eNBs 104 and the MME 122. The X2 interface may be the interface between eNBs 104. The X2 interface may comprise two parts, the X2-C and X2-U. The X2-C may be the control plane interface between the eNBs 104, while the X2-U may be the user plane interface between the eNBs 104.

With cellular networks, LP cells 104b may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, or may operate on different frequency bands with each cell operating in a different frequency band or only cells of different sizes operating on different frequency bands. As used herein, the m LP eNB refers to any suitable relatively LP eNB for implementing a smaller cell (smaller than a macro cell) such as a femtocell, a picocell, or a microcell. Femtocell eNBs may be typically provided by a mobile network operator to its residential or enterprise customers. A femtocell may be typically the size of a residential gateway or smaller and generally connect to a broadband line. The femtocell may connect to the mobile operator's mobile network and provide extra coverage in a range of typically 30 to 50 meters. Thus, a LP eNB 104b might be a femtocell eNB since it is coupled through the PDN GW 126. Similarly, a picocell may be a wireless communication system typically covering a small area, such as in-building (offices, shopping malls, train stations, etc.), or more recently in-aircraft. A picocell eNB may generally connect through the X2 link to another eNB such as a macro eNB through its base station controller (BSC) functionality. Thus, LP eNB may be implemented with a picocell eNB since it may be coupled to a macro eNB 104a via an X2 interface. Picocell eNBs or other LP eNBs LP eNB 104b may incorporate some or all functionality of a macro eNB LP eNB 104a. In some cases, this may be referred to as an access point base station or enterprise femtocell.

The core network 120 may also contain a Policy and Charging Rules Function (PCRF) (not shown) and a Home location register (HLR) (not shown). The PCRF may determine policy rules in the network core and accesses subscriber databases and other specialized functions, such as a charging system, in a centralized manner. The PCRF may aggregate information to and from the network, OSSs, and other sources, making policy decisions for each network subscriber active. The HLR is a central database that contains details of each subscriber that is authorized to use the core network 120.

Communication over an LTE network may be split up into 10 ms radio frames, each of which may contain ten 1 ms subframes. Each subframe of the frame, in turn, may contain two slots of 0.5 ms. Each subframe may be used for uplink (UL) communications from the UE 102 to the eNB 104 or downlink (DL) communications from the eNB 104 to the UE. In one embodiment, the eNB 104 may allocate a greater number of DL communications than UL communications in a particular frame. The eNB 104 may schedule transmissions over a variety of frequency bands. Each slot of the subframe may contain 6-7 OFDM symbols, depending on the system used. In one embodiment, each subframe may contain 12 subcarriers. In the 5G system, however, the frame size (ms) and number of subframes within a frame may be different from that of a 4G or LTE system. The subframe size may also vary in the 5G system from frame to frame. In some embodiments, the 5G system may span 5 times the frequency of the LTE/4G system, in which case the frame size of the 5G system may be 5 times smaller than that of the LTE/4G system.

A downlink resource grid may be used for downlink transmissions from an eNB 104 to a UE 102, while an uplink resource grid may be used for uplink transmissions from a UE 102 to an eNB 104 or from a UE 102 to another UE 102. The resource grid may be a time-frequency grid, which is the physical resource in the downlink in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE. A RB in some embodiments may be 180 kHz wide in frequency and 1 slot long in time. In frequency, RBs may be either 12×15 kHz subcarriers or 24×7.5 kHz subcarriers wide, dependent on the system bandwidth. In Frequency Division Duplexing (FDD) systems, both the uplink and downlink frames may be 10 ms and frequency (full-duplex) or time (half-duplex) separated. In TDD systems, the uplink and downlink subframes may be transmitted on the same frequency and are multiplexed in the time domain. The duration of the resource grid 400 in the time domain corresponds to one subframe or two resource blocks. Each resource grid may comprise 12 (subcarriers)*14 (symbols)=168 resource elements.

TDD systems may include UL, DL and, unlike FDD systems, special subframes due to the time-division aspect of the system when switching between UL and DL subframes. In particular, the special subframe may be preceded by a DL or UL subframe (and succeeded by a subframe of the opposite type) and may include both a UL and DL control region. A guard period may be reserved at the initiation of the special subframe to permit the UE 102 to switch between the receiver and transmitter chain.

Each OFDM symbol may contain a cyclic prefix (CP) which may be used to effectively eliminate Inter Symbol Interference (ISO, and a Fast Fourier Transform (FTT) period. The duration of the CP may be determined by the highest anticipated degree of delay spread. Although distortion from the preceding OFDM symbol may exist within the CP, with a CP of sufficient duration, preceding OFDM symbols do not enter the FFT period. Once the FFT period signal is received and digitized, the receiver may ignore the signal in the CP.

There may be several different physical downlink channels that are conveyed using such resource blocks, including the physical downlink control channel (PDCCH) and the physical downlink shared channel (PDSCH). Each downlink subframe may be partitioned into the PDCCH and the PDSCH. The PDCCH may normally occupy the first two symbols of each subframe and carry, among other things, information about the transport format and resource allocations related to the PDSCH channel, as well as H-ARQ information related to the uplink shared channel. The PDSCH may carry user data and higher layer signaling to a UE and occupy the remainder of the subframe. Typically, downlink scheduling (assigning control and shared channel resource blocks to UEs within a cell) may be performed at the eNB based on channel quality information provided from the UEs to the eNB, and then the downlink resource assignment information may be sent to each UE on the PDCCH used for (assigned to) the UE. The PDCCH may contain downlink control information (DCI) in one of a number of formats that indicate to the UE how to find and decode data, transmitted on PDSCH in the same subframe, from the resource grid. The DCI format may provide details such as number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the PDSCH is intended. Use of the UE-specific RNTI may limit decoding of the DCI format (and hence the corresponding PDSCH) to only the intended UE.

In addition to the PDCCH, an enhanced PDCCH (EPDCCH) may be used by the eNB 104 and UE 102. Unlike the PDCCH, the EPDCCH may be disposed in the resource blocks normally allocated for the PDSCH. Different UEs may have different EPDCCH configurations that are configured via. Radio Resource Control (RRC) signaling. Each UE 102 may be configured with sets of EPDCCHs, and the configuration can also be different between the sets. Each EPDCCH set may have 2, 4, or 8 PRB pairs. In some embodiments, resource blocks configured for EPDCCHs in a particular subframe may be used for PDSCH transmission if the resource blocks are not used for the EPDCCH transmissions during the subframe.

In order to enable retransmission of missing or erroneous data, the Hybrid Automatic Repeat Request (HARQ) scheme may be used to provide the feedback on success or failure of a decoding attempt to the transmitter after each received data block. When an eNB 104 sends data to the UE 102 in a PDSCH (or 5G PDSCH, referred to as an xPDSCH), the data packets may be sent together with indicators in a PDCCH in the same subframe that inform the UE 102 about the scheduling of the PDSCH, including the transmission time and other scheduling information of the transmitted data. For each PDSCH codeword that the UE 102 receives, the UE 102 may respond with an ACK when the codeword is successfully decoded, or a NACK when the codeword is not successfully decoded. The eNB 104 may expect the ACK/NACK feedback after a predetermined number of subframes from the subframe in which the PDSCH data is sent. Upon receiving a NACK from the UE 102, the eNB 104 may retransmit the transport block or skip the retransmission if the retransmission number exceeds a maximum value. The ACK/NACK for the corresponding the PDSCH may be transmitted by the UE four subframes after the PDSCH is received from the eNB 104. Depending on the number of codewords present, HARQ-ACK information corresponding to a PDSCH may contain, for example, 1 or 2 information bits (DCI formats 1a and 1b, respectively). The HARQ-ACK bits may then be processed, as per the PUCCH.

Figure 2:
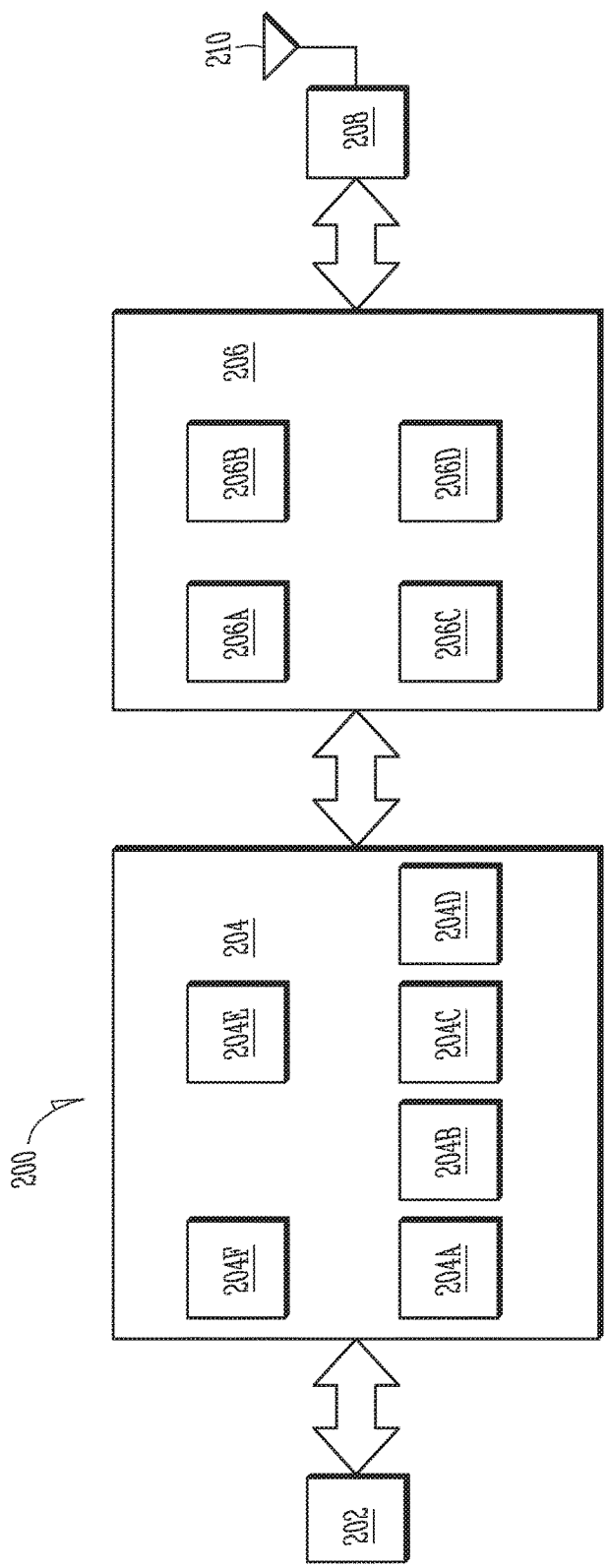
FIG. 2 illustrates components of a communication device in accordance with some embodiments.

Embodiments described herein may be implemented into a system using any suitably configured hardware and/or software. FIG. 2 illustrates components of a UE in accordance with some embodiments. At least some of the components shown may be used in the UE 102 (or eNB 104) shown in FIG. 1. The UE 200 and other components may be configured to use the synchronization signals as described herein. The UE 200 may be one of the UEs 102 shown in FIG. 1 and may be a stationary, non-mobile device or may be a mobile device. In some embodiments, the UE 200 may include application circuitry 202, baseband circuitry 204. Radio Frequency (RF) circuitry 206, front-end module (FEM) circuitry 208 and one or more antennas 210, coupled together at least as shown. At least some of the baseband circuitry 204, RF circuitry 206, and FEM circuitry 208 may form a transceiver. In some embodiments, other network elements, such as the eNB may contain some or all of the components shown in FIG. 2. Other of the network elements, such as the MME, may contain an interface, such as the S1 interface, to communicate with the eNB over a wired connection regarding the UE.

The application or processing circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a second generation (2G) baseband processor 204a, third generation (3G) baseband processor 204b, fourth generation (4G) baseband processor 204c, and/or other baseband processor(s) 204d for other existing generations, generations in development or to be developed in the future (e.g., fifth generation (5G), 5G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In sonic embodiments, modulation/demodulation circuitry of the baseband circuitry 204 may include FFT, precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDDC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 204e of the baseband circuitry 204 may be configured to run elements of the protocol stack for signaling of the PHY, MAC, RLC, PDCP and/or RRC layers. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry. In some embodiments, the device can be configured to operate in accordance with communication standards or other protocols or standards, including Institute of Electrical and Electronic Engineers (IEEE) 802.16 wireless technology (Wi-Max), IEEE 802.11 wireless technology (WiFi) including IEEE 802.11 ad, which operates in the 60 GHz millimeter wave spectrum, various other wireless technologies such as global system for mobile communications (GSM), enhanced data rates for GSM evolution (EDGE), GSM EDGE radio access network (GERAN), universal mobile telecommunications system (UMTS), UNITS terrestrial radio access network (UTRAN), or other 2G, 3G, 4G, 5G, etc. technologies either already developed or to be developed.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry to may be provided for processing signals for each spectrum, although the scope of the embodiments is not limited in this respect.

In some embodiments, the synthesizer circuitry 206d may be fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency twice the carrier frequency, four times the carrier frequency)) and used in conjunction with quadrature generator and divider circuitry to generate multiple signals at the carrier frequency with multiple different phases with respect to each other. In some embodiments, the output frequency may be a LO frequency (fix). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210.

In some embodiments, the UE 200 may include additional elements such as, for example, memory/storage, display, camera, sensor, and/or input/output (I/O) interface as described in more detail below. In some embodiments, the UE 200 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 200 may include one or more user interfaces designed to enable user interaction with the system and/or peripheral component interfaces designed to enable peripheral component interaction with the system. For example, the UE 200 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 210 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210 may be effectively separated to take advantage of spatial diversity and the different channel characteristics that may result.

Although the UE 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the to functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 3:
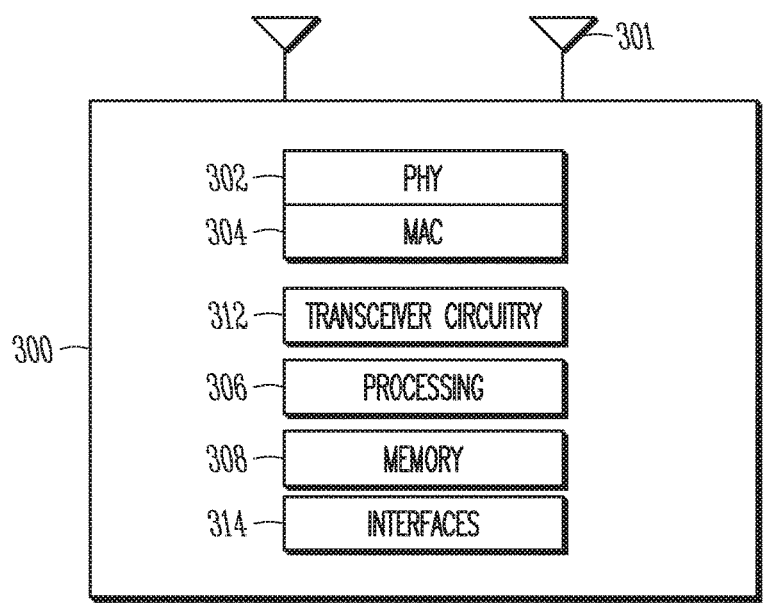
FIG. 3 illustrates a block diagram of a communication device in accordance with some embodiments.

FIG. 3 is a block diagram of a communication device in accordance with some embodiments. The device may be a UE or eNB, for example, such as the UE 102 or eNB 104 shown in FIG. 1 as described herein. The physical layer circuitry 302 may perform various encoding and decoding functions that may include formation of baseband signals for transmission and decoding of received signals. The communication device 300 may also include medium access control layer (MAC) circuitry 304 for controlling access to the wireless medium. The communication device 300 may also include processing circuitry 306, such as one or more single-core or multi-core processors, and memory 308 arranged to perform the operations described herein. The physical layer circuitry 302, MAC circuitry 304 and processing circuitry 306 may handle various radio control functions that enable communication with one or more radio networks compatible with one or more radio technologies. The radio control functions may include signal modulation, encoding, decoding, radio frequency shifting, etc. For example, similar to the device shown in FIG. 2, in some embodiments, communication may be enabled with one or more of a WMAN, a WLAN, and a WPAN. In some embodiments, the communication device 300 can be configured to operate in accordance with 3GPP standards or other protocols or standards, including WiMax, WiFi, WiGig, GSM, EDGE, to GERAN, UMTS, UTRAN, or other 3G, 3G, 4G, 5G, etc. technologies either already developed or to be developed. The communication device 300 may include transceiver circuitry 312 to enable communication with other external devices wirelessly and interfaces 314 to enable wired communication with other external devices. As another example, the transceiver circuitry 312 may perform various transmission and reception functions such as conversion of signals between a baseband range and a Radio Frequency (RF) range.

The antennas 301 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 301 may be effectively separated to take advantage of spatial diversity and the different channel characteristics that may result.

Although the communication device 300 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, FPGAs, ASICs, RFICs and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein.

Figure 4:
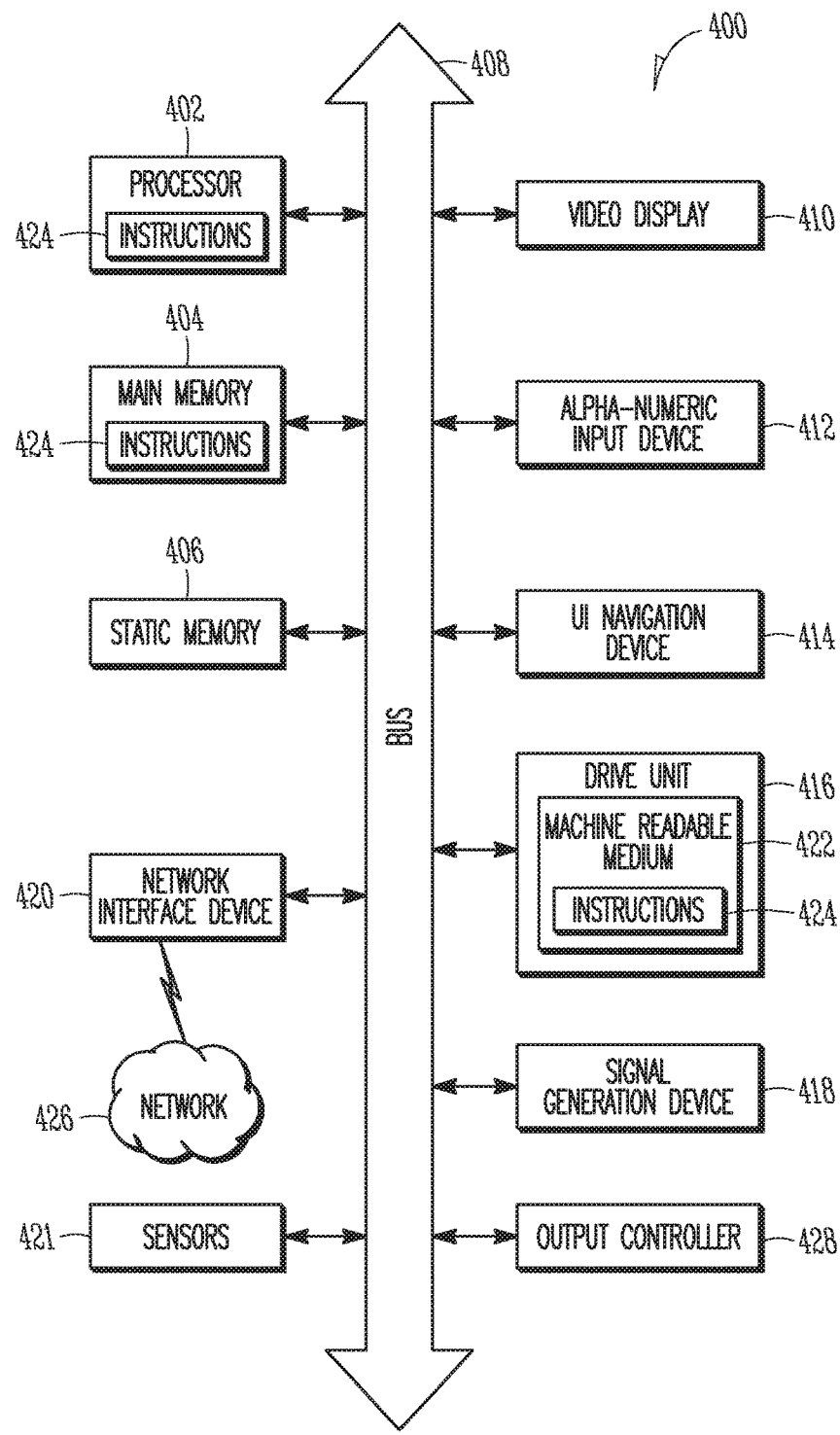
FIG. 4 illustrates another block diagram of a communication device in accordance with some embodiments.

FIG. 4 illustrates another block diagram of a communication device in accordance with some embodiments. In alternative embodiments, the communication device 400 may operate as a standalone device or may be connected networked) to other communication devices. In a networked deployment, the communication device 400 may operate in the capacity of a server communication device, a client communication device, or both in server-client network environments. In an example, the communication device 400 may act as a peer communication device in peer-to-peer (P2P) (or other distributed) network environment. The communication device 400 may be a UE, eNB, PC, a tablet PC, a set top box, a personal digital assistant, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In art example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The communication device 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The communication device 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The communication device 400 may include an output controller 428, such as a serial (e.g., universal serial bus (USB), parallel, or other wired or wireless (e.g., infrared (IR), near field communication (NFC), etc. connection to communicate or control one or more peripheral devices (e.g., a printer, card reader, etc.).

The storage device 416 may include a communication device readable medium 422 on which is stored one or more sets of data structures or instructions 424 software) embodying or utilized by any one or more of the techniques or functions described herein. The instructions 424 may also reside, completely or at least partially, within the main memory 404, within static memory 406, or within the hardware processor 402 during execution thereof by the communication device 400. In an example, one or any combination of the hardware processor 402, the main memory 404, the static memory 406, or the storage device 416 may constitute communication device readable media.

While the communication device readable medium 422 is illustrated as a single medium, the term "communication device readable medium" may include a single medium or multiple media (e.g., a centralized or distributed database, and/or associated caches and servers) configured to store the one or more instructions 424.

The term "communication device readable medium" may include any medium that is capable of storing, encoding, or carrying instructions for execution by the communication device 400 and that cause the communication device 400 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UNITS) family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), MIMO, or multiple-input single-output (MISO) techniques. In sonic examples, the network interface device 420 may wirelessly communicate using Multiple User MIMO techniques. The term "transmission medium" shall be taken to include any intangible medium that is capable of storing, encoding or carrying instructions for execution by the communication device 400, and includes digital or analog communications signals or other intangible medium to facilitate communication of such software.

In the LTE system, various types of reference signals may be transmitted by the eNB for a UE to measure. The reference signals may include, for example, cell-specific reference signals (CRS) and UE-specific reference signals (DMRS). The CRS may be used for cell search and initial acquisition, demodulation and channel quality estimation. The DMRS may be used for PDSCH demodulation by the UE, as well as for handover. The number and type of downlink reference signals has increased with newer generations of LTE networks, which has led to issues due to the increased number of antennas, antenna panels and antenna ports. In particular, the eNB and/or UE may use specific reference signals in beamforming to increase data throughput or quality, As above, it may be desirable to ensure a reliable link given the unfavorable effects of the propagation environment and dependence on beamforming for compensating pathloss using one or more types of reference signals. In some situations, a single beam from a single transmission point (TP) may be available and used by the UE. In other embodiments, multiple beams from multiple TPs may be used to ensure at least one reliable radio link from one of the TPs. In embodiments in which a dual system is used, two beams from two TPs may be used for each UE. Establishment of, tracking by and reconfiguration of single or dual beam operation is described herein.

Figure 5:
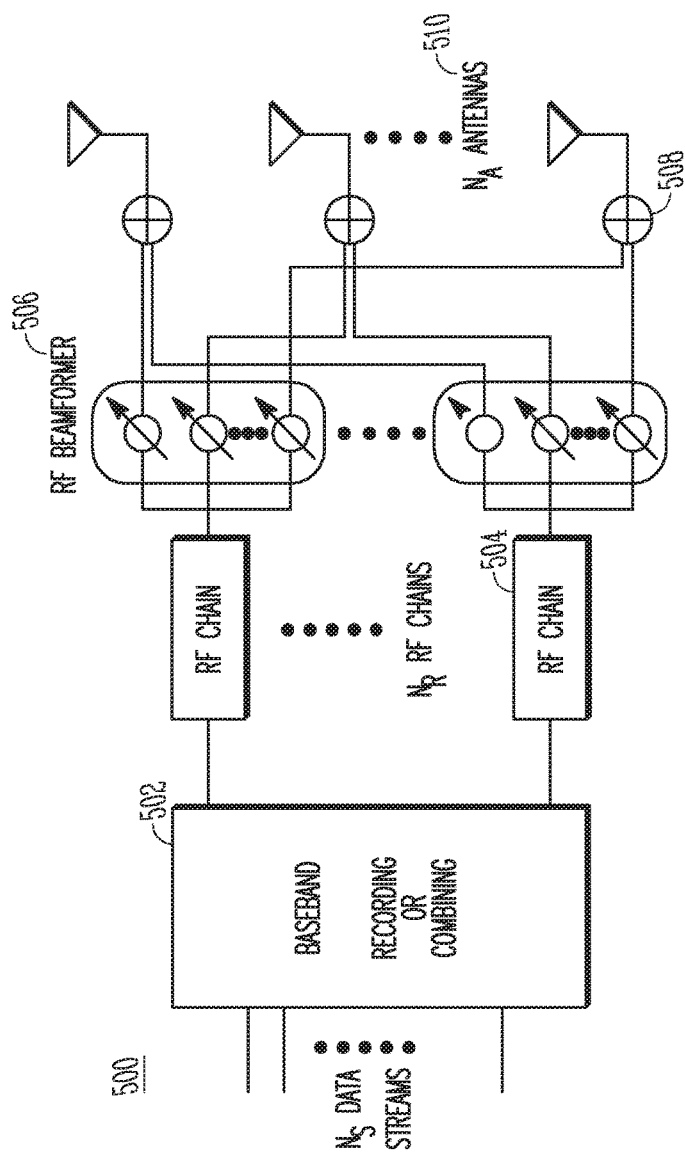
FIG. 5 illustrates a high level block diagram of a hybrid beamforming front-end architecture in accordance with some embodiments.

FIG. 5 illustrates a high level block diagram of a hybrid beamforming front-end architecture in accordance with some embodiments. The front-end architecture 500 may be provided in any of the UEs or eNBs shown in FIGS. 1-4. Other components may be present, but are not shown for simplicity. Traditional beamforming may be performed at baseband only. Hybrid beamforming relies on RF preceding to reduce the number of RF chains. The front-end architecture 500 may comprise baseband circuitry 502, RF chains 504, RF beamformers 506, combiners 508 and antennas 510.

Precoding uses the baseband circuitry 502 to weight different data streams received by the baseband circuitry 502. The weighting, as indicated, may occur at baseband rather than at intermediate frequencies or RF. The precoded signals of the data streams may then be supplied to the RF chains 504, where the signals may be amplified using one or more amplifiers (such as a power amplifier), filtered using one or more low-pass or band-pass filters for example, and upconverted to RF frequencies using mixers and a local oscillator for example, among others. Each RE chain 504 may be associated with a different set of precoded signals. The number of RF chains 504 and the number of data streams supplied to the baseband circuitry 502 may be different.

The RF signals from the RF chains 504 may then be supplied to the RF beamformer 506. Each RF beamformer 506 may provide multiple outputs containing the same data with different weights attached to each output The signals from the RF beamformer 506 may then be added at a series of combiners 508. Each combiner 508 may combine a unique signal from each RF beamformer 506. Thus, in some embodiments no signal from any RF beamformer 506 may be supplied to multiple combiners 508. The signals from each combiner 508 may then be supplied to a different antenna 510, where the signals are transmitted. In some embodiments, the combiners 508 may be replaced with switches. In either case, each UE may be associated with a different weighting and thus beam.

The antenna patterns associated with each of the RF chains 506 are directional and thus may be relatively narrow as determined by the weights in the RF beamformer 506. In some embodiments, the RF (analog) beamformer weights may be wideband and phase-only, i.e., only the phase of the various RF chains 506 may be adjusted by each RF beamformer 506.

In general, embodiments herein relate to single or dual beam operation for a UE where each beam is an active link that can be defined using Beamformed Reference Signals (BRSs) and/or Beam Refinement Reference Signals (BRRS). Each active link may define a Tx/Rx beam combination from a TP (or one of two different TPs) that can be potentially used for data transmission. Some embodiments may relate to how the single or dual beam operation is determined, tracked and reconfigured in the system. A particular active link, called the serving link, may be used for data transmission. Some embodiments may enable smooth switching among the set of active links.

Figure 6A:
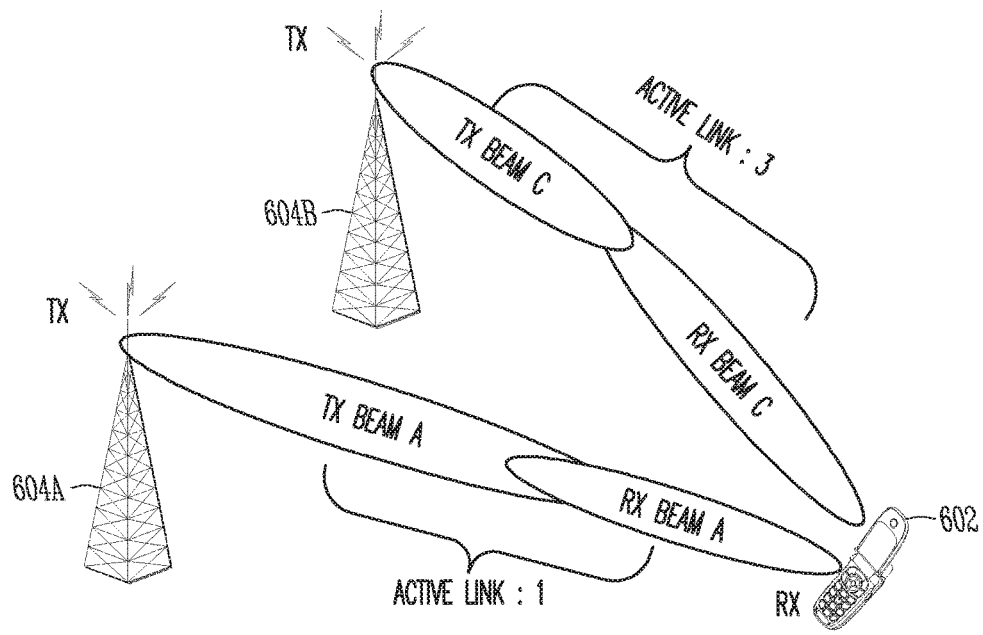
FIGS. 6A and 6B illustrate an active link and dual beam operation in accordance with some embodiments.
Figure 6B:
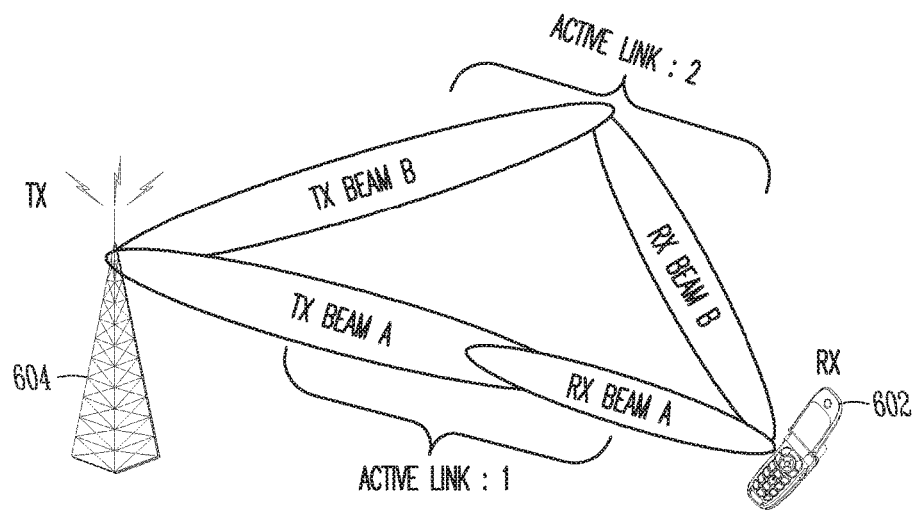

In some embodiments, only a single active link may exist between a TP and UE. In other embodiments, multiple active links may be associated with a single UE. FIGS. 6A and 6B illustrate an active link and dual beam operation in accordance with sonic embodiments. The operation shown in FIG. 6A and 6B may be carried out by the UEs and eNBs described in relation to FIGS. 1-5. In particular, FIG. 6A shows dual beam operation from different eNBs (TPs) 604a, 604b, while FIG. 6B shows dual beam operation from a single eNB 604. This is to say that in FIG. 6A, the UE 602 may communicate with each of a plurality of eNBs 604a, 604b through a single active link (active link 1 for eNB1 604a and active link 3 for eNB2 604b). In FIG. 6B, the UE 602 may communicate with a single eNB 604 through dual active links (active link 1 and 2).

In various embodiments, independent of the number of TPs, there may be a single or multiple active links (active link 1 and active link 2 and/or active link 3) between a particular eNB (Tx beam) 604 and UE (Rx beam) 602. Each active link may be a Tx-Rx beam combination as shown in FIGS. 6A and 6B. The Tx and Rx beams (Tx beam A, Tx beam B, Tx Beam C and Rx beam A, Rx beam B, Rx beam C) may generally be formed by the RF beamforming to circuit shown in FIG. 5. Thus, although not shown, in some embodiments multiple active links may exist between each of multiple eNBs and a single UE. Note that in FIG. 6B, the active links may include a direct active link formed through a direct connection between the eNB 604 and the UE 602 and an indirect active link formed via a reflection (e.g., a reflection off of a building or other object) or other indirect path between the eNB 604 and the UE 602.

Figure 7:
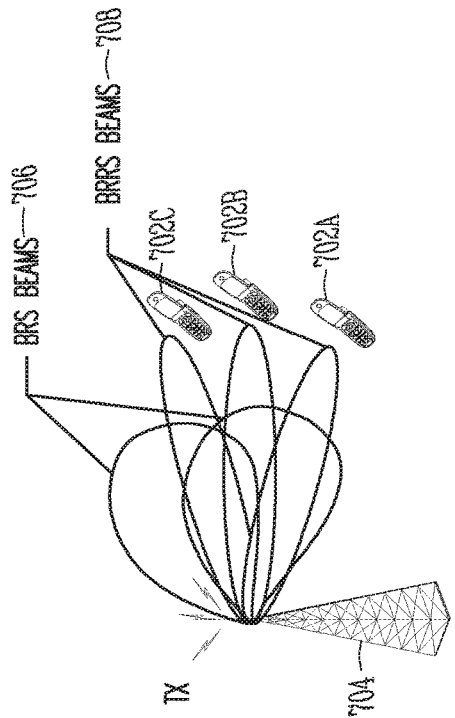
FIG. 7 illustrates Beamformed Reference Signals (BRS) and Beam Refinement Reference Signals (BRRS) in accordance with some embodiments.

An eNB 604 may transmit different reference signals in each Tx beam for power measurement and beam selection by the UEs 602. As above, at least some of these reference signals may be include BRS and BRRS, also described herein as BRS beams and BRRS beams. FIG. 7 illustrates BRS and BRRS in accordance with some embodiments. The UEs 702a, 702b, 702c and eNB 704 may be shown in FIGS. 1-4.

In some embodiments, the BRS 706 may be located in different symbols within a specific BRS subframe. The eNB 704 may broadcast different BRS 706 in the PDSCH on different antennas. The BRS sequence, as well as the location, may differ from beam to beam, subframe to subframe or symbol to symbol. In particular, the different BRS 706 may use different sequences to enable the UE to distinguish between the various BRS 706. The sequences may be similar to those used for Secondary Synchronization Signal (SSS) sequences, which may be an interleaved concatenation of two length-31 binary sequences scrambled with a scrambling sequence given by the Primary Synchronization Signal (PSS). The BRS 706 transmitted from each eNB antenna port (or BRS port) may be a cyclic shift of a base sequence.

The BRS 706 may be cell-specific. The BRS 706 may have a BRS ID. In some embodiments, the BRS 706 may be a member of a group of BRS 706 and thus also have a BRS group ID. The UE 702a, 702b, 702c may perform a scan to determine for which BRS 706 to measure the BRS receive power (BRSRP). The UE 702a, 702b, 702c may subsequently transmit to the eNB 704 BRSRP information, as well as identity information of the BRS 706 used in the BRSRP measurement and the UE 702a, 702b, 702c as described in more detail below. This information, for example, may enable the eNB 704 to determine the optimal direction for transmitting data to the UE 702a, 702b, 702c to, for example, maximize the beamforming gain for the UE 702a, 702b, 702c.

The BRS 706 may be defined, as above, by a BRS ID and may be broadcast periodically within the cell. The BRS ID may have a BRS port index (antenna port) associated a cell ID. The cell ID may be carried via the PSS, SSS, or Physical Broadcast Channel (PBCH), for example. The BRS ID can be determined by the BRS index, the BRS resource index, and/or a subframe index for the BRS. The BRS ID may identify a set of time/frequency resources used for transmitting the corresponding BRS and thus may uniquely identify a particular Tx beam, e.g., Tx beam A, Tx beam B or Tx beam C shown in FIGS. 6A and 6B. The BRS 706 may be optimized to maximize, or provide a tradeoff between, one or more of: coverage, access latency and beamforming gain.

An active link may, in some embodiments, have an active link ID and be defined in an Active_Link information element (IE):

```
Active_Link = {
    Active Link ID
    BRS ID
}
``` where the BRS ID may contain the BRS port index of the Tx beam that is associated with the Cell ID of the eNB transmitting the Tx beam. An active link may thus be defined by a BRS ID.

As is clear from the Active_Link IE, the Rx beam (whether Rx beam A, Rx beam B or Rx beam C shown in FIGS. 6A and 6B) may not be explicitly defined for an active link. In some embodiments, the eNB may assume that the same Rx beam that the UE used for measuring BRSRP corresponding to the BRS ID is used by the UE for the Rx beam. Alternatively, the eNB may assume that the same Rx beam used for a CSI report corresponding to a CSI resource that is associated with the active link ID is used by the UE for the Rx beam. The eNB may choose the option that is most recent. In other embodiments, rather than make one of the two assumptions above, the UE may associate a Rx beam for the active link that can provide the same or better downlink performance compared to the Rx beam used for measuring BRSRP corresponding to the BRS ID. The UE may then provide ID information of the to Rx beam to the eNB for use in defining the active link.

Note that a CSI resource may be associated with a particular Tx beam by associating an active link (or active link list) with a CSI resource as defined, higher layer signaling for example. The CSI resource may be associated by further indicating a particular active link ID in the DCI used for CSI resource indication. This indication may be aperiodic or periodic, for example being semi-persistently scheduled. The CSI Resource Config may be defined as:

```
CSI Resource Config = {
    CSI Resource ID
    Active Link List ID
    RE Mapping for NZP CSI-RS, ZP CSI-RS, NZP Interference RS,
}
``` where the resource element (RE) mapping for both non-zero and zero power CSI-RS, non-zero power RS and intermodulation ratio (IMR) are provided in the configuration. A particular active link ID can be indicated in the DCI along with CSI resource indication. In the above, the structures Active_Link, Active_Link_List, CSI Resource Config may be defined in a higher layer specifications.

In some embodiments, rather than using the BRS ID alone, it may be desirable the eNB 704 to tailor a Tx beam for a particular UE 702a, 702b, 702c using the BRRS 708 to focus solely on beamforming gain and/or spectral efficiency for a particular UE. The BRRS 708 may thus be UE-specific. The BRRS 708 can be generated within one OFDM symbol, using frequency domain down-sampling which changes the sampling band edge and scales the amplitude of the sampled signal. By the down-sampling, the number of time-domain samples can be reduced so that the subcarrier spacing can be increased. The BRRS 708 may be generated using a Zadoff-Chu sequence. The sequence may be a function of slot number, cyclic shift, virtual cell ID, the number of antenna ports, an antenna-port-to-cyclic-shift mapping function where the cyclic shift is determined by a hash table, and the number of BRRS subcarriers. The sequence to may be mapped to resource elements on antenna ports as a function of the number of BRRS sequence replicas in one symbol, the total number of downlink resource blocks and the subcarrier number per resource block. The BRRS 708 can be mapped to multiple BRRS symbols with repeated pattern and sequence, where the number of BRRS symbols may be defined by the system or indicated by the DCI and may be transmitted in one or more OFDM symbols, A BRRS resource ID can be defined in a BRRS resource Config as follows:

```
BRRS resource Config {
    BRRS resource ID
    BRRS port number
    BRRS port RE Mapping
    BRS_ID (optional)
}
```

A BRS ID may be optionally included in the BRRS resource Config to indicate that the beam associated with the BRS ID and the beam associated with the BRRS port are strongly correlated. This information can be used by the UE 702a, 702b, 702c to select a subset of UE Rx beams for refinement corresponding to the BRRS resource. In contrast to BRS, which may be periodically broadcast, a BRRS resource may be allocated aperiodically to a UE and, as mentioned above, a BRRS Tx beam is UE specific. The BRS ID may also be used for tracking purposes. A UE, however, may continuously track a BRRS resource ID if the BRRS resource ID defines an active link. In this case, a UE may, under certain predetermined conditions, use the BRS resource indicated by the BRS ID for UE Rx beam refinement. An example of such a predetermined condition may be that the UE is not assigned a BRRS resource associated with the BRRS resource m in a predetermined time. This time may be, for example, the last 100 subframes.

Figure 8:
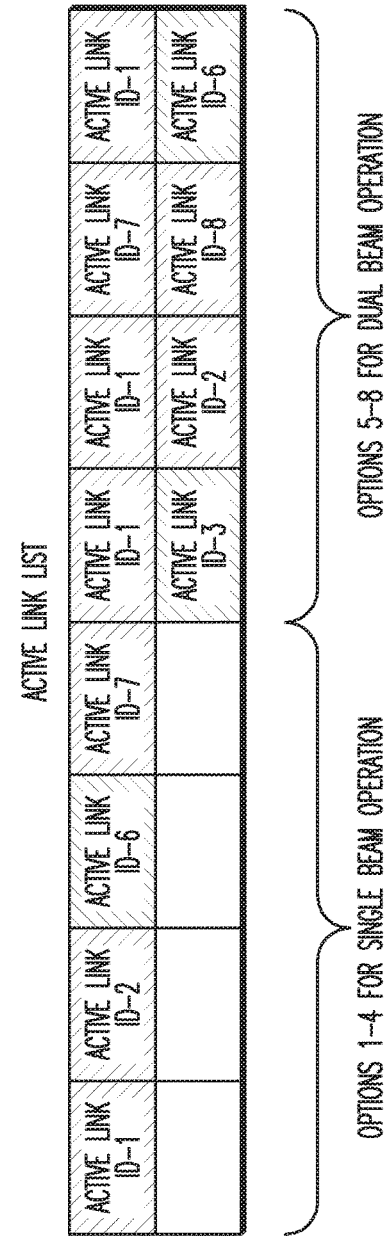
FIG. 8 illustrates active link options in accordance with some embodiments.

FIG. 8 illustrates active link options in accordance with some embodiments. Specifically, in FIG. 8, the active link list for single beam and dual beam operation is shown for different eNBs. An active link list may be defined as a 2D array of active links. After determining the active link list, the eNB may communicate the active link list to the UE using RRC signaling.

An active link list may be defined as:

```
Active_Link_List = {
    Active_Link_List ID
    SEQUENCE (SIZE (1....MAX_LIST_SIZE)) of Active Link-ID
}
``` where the active link ID is defined as provided above. In FIG. 8, Active Link List options 1-4 illustrate single beam operation in which the active link ID for the eNB (TPI) may be different for each option. Active Link List options 5-8 contains pairs of active link IDs. Each pair of active link IDs may comprise active links associated with the same eNB or different eNBs (TP1 and TP2). Options 5-8 may occur when the UE is able to simultaneously receive, via the antenna panel in the UE, multiple beams whose REs overlap, while options 1-4 may occur when the UE is unable to simultaneously receive the multiple beams.

In determining the active link list, the UE may first measure one or more BRS in one or more subframes. The UE may use the measurements to derive a BRS receive power (BRSRP) corresponding to each of the BRS IDs, which are associated with the BRS. The BRS IDs may be indicated from the eNB to the UE via higher layer signaling.

Alternatively, the UE may autonomously determine the BRS Ms. The UE may observe a single instance (subframe) or multiple instances of the same BRS ID to train the Rx beam to maximize the BRSRP. After maximization, the UE may provide BRSRP feedback to the eNB. The BRSRP feedback may indicate the BRS ID and the optimal BRSRP obtained for each BRS ID. The reports containing the BRSRP information may be transmitted by each UE at predetermined times, in a PUSCH allocated for BRSRP transmission after a predetermined number of BRS subframes have been transmitted by the eNB.

Based on the reports from the UE, the eNB can select a set of BRS IDs as the active link list. For instance, the eNB can select the BRS IDs with the highest BRSRP values to form the active link list. Thus, for each active link ID in active link list options 1-4, a UE may maintain an Rx beam that maximizes the RSRP associated with the link. In other embodiments, the eNB can select the active links for dual band operation based on other characteristics of the BRSRP values, such as the least variation over the measurement period of the beams or whether the BRSRP is increasing or decreasing and by how much, or a combination of BRSRP characteristics of the different beams. The eNB may also form the active link list using a different set of BRS IDs based on other implementation-based techniques, such as forming compromise beams—beams that can simultaneously serve multiple users. In some embodiments, for non-standalone operation, the active link list may be conveyed via a different Radio Active Technology (RAT) e.g., LTE. This is to say that the reports may be shared among neighboring eNBs and/or the active link list may be determined by a predetermined eNB associated with the UE (e.g., the serving eNB) and provided to adjacent eNBs via the X2 interface.

The active link list may have any number of entries, depending on the number of beams and the number of beams that satisfy the active link criteria based on the BRS/BRRS measurements, as determined by the eNB. Various active link Ms may be indicated in the active link list, with each eNB having one or more active link IDs. As shown in options 1-4 of FIG. 8, several active link IDs may be used for communication between eNB1 (TP1) and the UE, while only a single active link ID may be for communication between eNB2 (TP2) and the UE. In other examples, any number of active link IDs may exist for each of eNB1 and eNB2, such as each having multiple associated active link IDs.

Active Link List options 5-8 support dual beam operation, which includes dual eNB operation. A set of BRS ID pairs from one or two eNBs may be indicated via higher layer signaling. In one example, all combinations of BRS ID set. A={BRS ID-1, BRS ID-2} with BRS ID set B={BRS ID-3, BRS ID-4} may be used, resulting in 4 BRS-ID pairs. The UE may derive two BRSRP measurements corresponding to a pair of BRS IDs (e.g., {BRS ID-1, BRS ID-3}) by training Rx beams pursuant with the above characteristics. For example, the UE may train the Rx beams to jointly maximize the value of the BRSRP pairs. In other embodiments, different optimization criteria can be used. For example, it may be desirable to maximize the average BRSRP or to maximize the minimum BRSRP among the dual beams. Based on the UE reports, the eNB can select a set of BRS ID pairs as the active link list options 4-8. For instance, the eNB can select the BRS ID pairs with highest average BRSRP values to form the active link list options 4-8. Thus, for each active link ID pair in active link list options 4-8, a UE may maintain a Rx beam pair that optimizes the RSRPs associated to this pair of links.

Similar to the above for single beam operation by the UE, the eNB may establish an active link list having any number of pairs for dual beam operation by the UE. As shown in the example shown in FIG. 8, different active link ID combinations may be available. The combinations may include dual beam operation for reception from a single eNB, such as use of active link 1 and active link ID 2 or active link ID 7 and active link ID 8. The combinations may include dual beam operation for reception from multiple eNBs, such as use of active link ID 1 and active link ID 3 or active link ID 1 and active link ID 6. Thus, the same active link ID may be used by the UE for dual beam operation from a single eNB or multiple eNBs. Although a plurality of active link ID combinations are shown, in other embodiments, only one active link ID combination (or any number of combinations) may be available for either or both dual beam operation from a single eNB or multiple eNBs.

Once the active link list is determined by the serving eNB, the active link list can be communicated to the UE via higher layer signaling. The higher layer signaling may be performed by RRC or MAC layers. In some embodiments, a set of links can be configured via the higher layer signaling, but only a subset of the links may be active for the UE. This may be indicated using MAC based commands or physical layer commands (e.g. reliable DCI messages). The signaling may occur via a 4G or 5G link, for example in an anchor booster embodiment in which the anchor cell provides 4G communications and a booster cell provides 5G communications. Once the UE is aware of the active link list, the UE may continuously track the Tx beams indicated by the BRS IDs in the active link IDs in the active link list. The UE may also monitor Tx beams that are not part of the active link list for other purposes, such as mobility and handover. The UE may continue to evolve the optimal Rx beam corresponding to a given active link. A predetermined set of filtering parameters may be communicated to the UE from the eNB to this end.

After transmitting the active link list to the UE, a particular active link can be chosen by the eNB as the serving link. An eNB may obtain CSI feedback corresponding to an active link by triggering CSI feedback associated with a CSI resource. As described above, the CSI Resource Config may be communicated to the UE using RRC signaling, for example, and the associated active link ID indicated in the DCI. The UE may be expected to the use the Rx beam associated with the active link for determining CSI feedback. The eNB may use the Tx beam associated with the active link for transmitting the CSI-RS. The eNB may obtain CSI feedback corresponding to multiple active links by configuring and triggering CSI request(s) for multiple CSI resources. The eNB may select the active link fulfilling one or more predetermined criteria as the serving link. For example, the active link having the best CSI feedback and/or the active link that is least loaded (or relatively lightly loaded compared with the other active links) may be selected as the serving link. A link that is relatively lightly loaded may be quantified as having less than about 10-50% of the loading of the maximum loaded link or simply being one of the least loaded (say 2 or 3) of the active links. The eNB may also simply designate a particular active link as the serving link based on a BRSRP report (e.g., selecting the active link with the best BRRSRP feedback), instead of using the CSI report.

After selecting the serving link, the eNB may indicate the serving link ID to the UE. This indication can be provided to the UE through the DCI or through a MAC IE. If the cardinality of the active link list is N, ceil[log2(N)] bits can be used in the DCI for indicating the serving link ID. A UE receiving the serving link ID in subframe n may be expected to use the associated Rx beam for control channel (e.g. PDCCH) reception in downlink subframes after subframe n+k. The value k may be predefined in the 3GPP standard, or may be a UE-specific value that may be known to the eNB as part of capability exchange. A UE may be expected to use the Rx beam associated with the to serving link for both PDCCH and PDCCH reception in a given subframe. In non-standalone operation, the indication of the serving link ID may be performed through a different RAT. The Rx beam change may be limited to particular circumstances, for example, occurring only when the PDCCH is received if the serving link ID indication is transmitted by DCI or when an ACK is received if the indication is transmitted by MAC IE.

Figure 9:
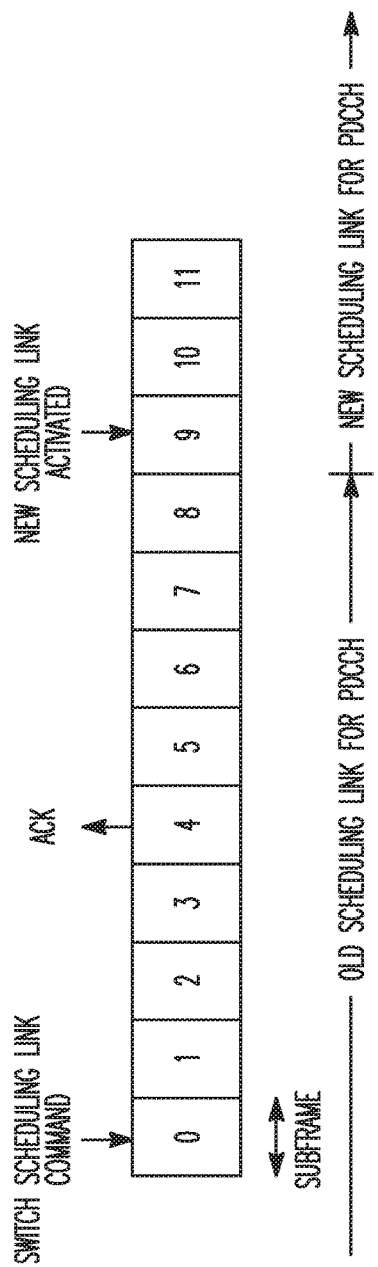
FIG. 9 illustrates switching of at least one scheduled link in accordance with some embodiments.

FIG. 9 illustrates switching of at least one scheduled link in accordance with some embodiments. Each of the active link list options described above can be indicated to the UE as a designated scheduling link or links. For an active link list of size 8, as shown in FIG. 8, 3 bits may be used in the DCI or MAC control element. The UE may monitor the PDCCH on the scheduling link(s).

In some embodiments, however, the scheduled links may be changed from time to time. The timeline for switching among the active link list options is shown in FIG. 9. A UE may be instructed to switch the scheduled links from a first active link list option in the active link list to a second active link list option in the active link list in subframe n. As above, the UE may be expected to effect this switch in subframe n+k. In some embodiments, k may be 8 or 9 so that the switch occurs within about 10 ms (1 frame). This may allow the eNB to receive an ACK associated with the switching command (which usually occurs in subframe n+4) as well as processing time for the UE/eNB. The use of k=8 or 9 may thus permit reissuing of the switching instruction from the eNB if the eNB does not receive an ACK from the UE.

The switching command, as above, can be indicated to the UE in subframe n through the DCI or through a MAC control element. If the switching command is included in the DCI, the worst case probability that the Tx-Rx beam synchronization is lost may be given by P{PDCCH loss}*P{RX->ACK}~0.01%. In embodiments in which the switching command is included in the MAC control element, if an ACK is not detected by the eNB, the eNB may repeat the switching command in subframe n+8 (assuming k=8). The worst case probability that the Tx-Rx beam synchronization is lost in this case may be given by P{ACK miss}*P{PDCCH miss at n+8}~0.01%. For dual beam operation, switching from option 5 to option 6 as shown in the active link list of FIG. 7 may not change active link ID-1, although active link ID-3 associated with a Tx beam from eNB2 may change to active link ID-2 associated with a Tx beam from eNB1. This may be beneficial in case the switching command is not received properly at the UE. Switching from option 6 to option 7, as shown however, does not have this benefit as both active link IDs change in this case.

Figure 10:
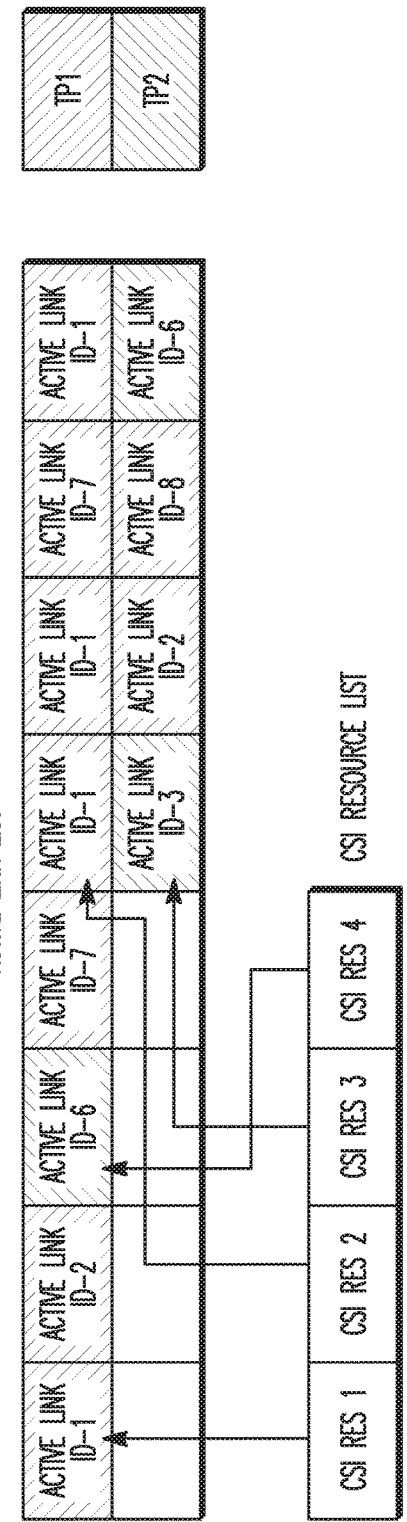
FIG. 10 illustrates Channel State Information (CSI) resources for active link options in accordance with some embodiments.

FIG. 10 illustrates Channel State Information (CSI) resources for active link options in accordance with some embodiments. The CSI resources may be used in any of the single or dual TP options. As indicated above, a CSI resource may be associated with an active link list ID. In some dual TP options embodiments, the CSI Resource Config given previously can be slightly modified as:

```
CSI Resource Config = {
CSI Resource ID
Active Link List [option x][pair y]
RE Mapping for NZP CSI-RS, ZP CSI-RS, NZP Interference RS,
}
``` where Active Link List [option x][pair y] may point to an active link m in the active link list shown in FIG. 8. By defining a pointer, the active link list can be reconfigured without reconfiguring the CSI resource definitions.

In various embodiments, each CSI resource ID may point to a unique active link or multiple CSI resource ID may point to the same active link. For example, as shown in FIG. 10, CSI resource ID 1 and CSI resource ID 2 both point to active link ID-1, but in two different active link list options: single beam option 1 and dual beam option 5. This may result in different Rx beam configurations for CSI resource ID 1 and CSI resource ID 2. In FIG. 10, CSI resource ID 2 and CSI resource ID 3 can be transmitted to the UE in a single OFDM signal due to dual Rx beam operation. CSI resource ID 1 and CSI resource ID 4, however, cannot be transmitted in the same OFDM symbol as the Rx beam configuration for these two cases may be different.

Similar to the CSI resource, a BRRS resource can also be associated with an active link ID and may be modified from the BRRS resource above. The BRRS resource can be configured as:

```
BRRS Resource Config = {
BRRS Resource ID
Active Link List [option x][pair y]
RE Mapping for a port
}
```

The operation of a BRRS resource with respect to the association with an active link m may be similar to the above dual beam CSI resource. However, multiple BRRS resources may be able to be transmitted to the UE in a single OFDM symbol since the UE is able to switch Rx beams within an OFDM symbol.

For a UE with multiple antenna panels, different antenna panel may be used to target different eNBs. To refine the Rx beam in one antenna panel, the antenna panel index or simultaneous Rx beam index may be indicated with the BRRS Resource Config to support inter-antenna panel Rx beam refinement for UE rotation. The component active link list [option x][pair y] may indicate to the UE that there is a paired active link ID which is also associated with active link list [option x].

Figure 11:
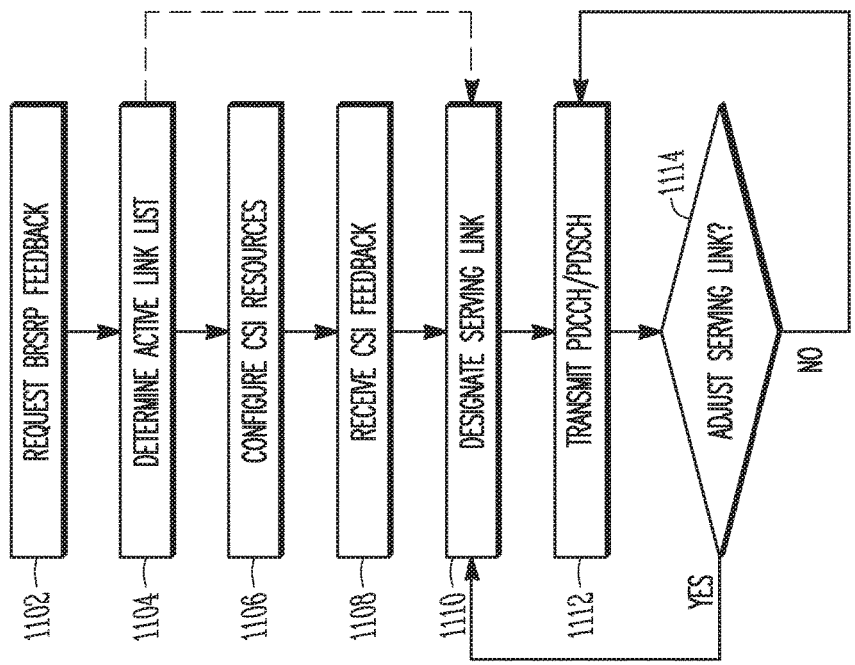
FIG. 11 illustrates a method of establishing a serving link by an eNB according to some embodiments.

FIG. 11 illustrates a method of establishing a serving link by an eNB according to sonic embodiments. The method of FIG. 11 may be performed by any of the eNBs and UEs shown in FIGS. 1-5 and use any of the techniques described in relation to FIGS. 6-10. The various transmissions may be encoded at the transmission source and decoded at the transmission destination.

At operation 1102, the eNB may request BRSRP feedback corresponding to a set of BRS ports for single beam operation or corresponding to a set of BRS port pairs for dual beam operation. The eNB may transmit the request to multiple UEs simultaneously. The eNB may, in response, receive a BRSRP report from the UE. The BRSRP report may contain a BRS ID and the optimum BRSRP obtained for the BRS ID.

After receiving the BRSRP report from the UE for each BRS ID, at operation 1104, the eNB may determine an active link list for the UE. The active link list may support single and/or dual beam operation. The eNB may then transmit the active link list to the UE via RRC or other higher layer signaling.

Subsequent to the transmission of the active link list, the eNB may configure one or more CSI resources at operation 1106. Each CSI resource may point to an active link ID in the active link list. The UE Rx beam configuration may be set to a dual beam configuration if the associated active link ID is part of a dual beam option. The Rx beam configuration associated with an active link ID may be used for CSI resource reception and CSI determination. In some embodiments, the eNB may indicate an active link in the DCI along with each CSI resource indication.

At operation 1108, the eNB may receive CSI feedback from the UE. The CSI feedback may correspond to the configured CSI resources. In sonic embodiments, the eNB may then configure one or more BRRS resources. If a BRS ID is associated with the BRRS resource, then the eNB Tx beam associated with the BRS ID may be considered to be strongly correlated with the Tx beam associated with the BRRS resource. The eNB may then receive BRSRP feedback from the UE corresponding to the configured BRRS resources.

Whether or not BRRS resources are configured and feedback received from the UE, the eNB may, after receiving the CSI feedback, designate an active link as the serving link at operation 1110. In sonic embodiments, as shown by the dashed line in FIG. 11, the designation of serving link can happen immediately after the setup of the active link list, without configuration of the CSI resources at operation 1106 or reception of the CSI feedback at operation 1108. The eNB may indicate the serving link ID to the UE using a DCI or MAC control element in subframe n. The active link used for the CSI measurement may be used to provide the DCI or MAC control element in subframe n. In embodiments in which dual beam operation is used, the eNB may designate an active link option as a pair of serving links.

The eNB may at operation 1112 subsequently transmit control and data to the UE on a PDCCH and PDSCH. The PDCCH and PDSCH may to use the Tx beam associated with the serving link. The transmissions may occur in subframe n+k, k subframes after transmission of the serving link ID to the UE.

At operation 1114, the eNB may determine whether the serving link(s) is to be adjusted for the UE. The BRS, BRRS and/or CSI feedback from the UE, which may be provided periodically (in the case of the BRS and CSI) or aperiodically (in the case of the BRRS) from the UE, may be used to make this determination. If not, the eNB may return to operation 1112, in which control and data signals may be transmitted to the UE using the same serving link(s). If so, the eNB may return to operation 1110, in which a new serving link(s) may be determined, indicated to the UE, and used for subsequent control and data transmissions.

Figure 12:
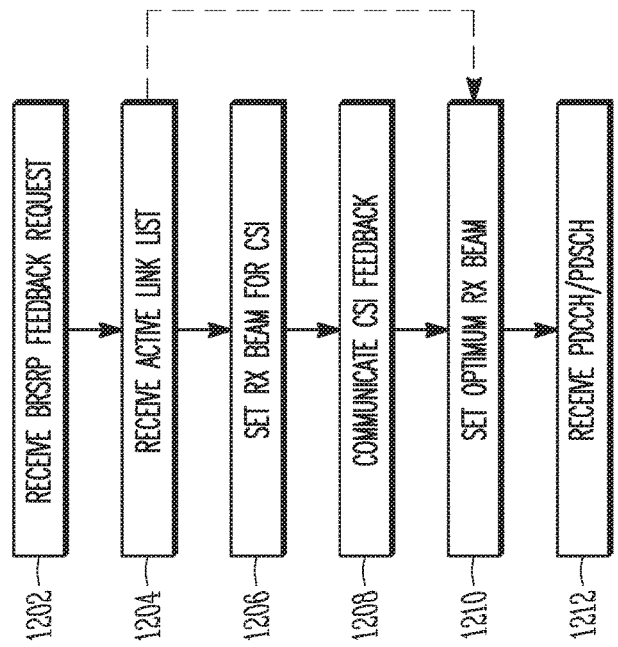
FIG. 12 illustrates a method of establishing a serving link by a UE according to some embodiments.

FIG. 12 illustrates a method of establishing a serving link by a UE according to some embodiments. The method of FIG. 12 may be performed by any of the eNBs and UEs shown in FIGS. 1-5 and use any of the techniques described in relation to FIGS. 6-10.

At operation 1202, the UE may receive a request for BRSRP feedback corresponding to a set of BRS IDs (single beam operation) or BRS ID pairs (dual beam operation). The UE may continuously track the set of BRS port or port pair associated with the BRS IDs and refine the UE Rx beams based on one or more instances of each BRS port. The UE may use the measurements to derive the BRSRP corresponding to each BRS port.

After obtaining the predetermined number of instances of each BRS port, for single beam operation the UE may obtain the optimal BRSRP value for a given BRS port from among all the trials of the different Rx beams. The optimal BRSRP value may be the maximum value or based on other predetermined criteria provided to the UE from the eNB via higher layer signaling. The UE may subsequently for single beam operation report a set of optimal BRSRP values to the eNB, where each value corresponds to a unique BRS port. Similarly, for dual beam operation, the UE may obtain the optimal BRSRP value pair for a given BRS port pair that can be achieved with dual beam operation from among all the trials of the different Rx beams. The UE may report for dual operation a set of optimal BRSRP value pairs to the eNB.

After transmitting the BRSRP values or value pairs to the eNB, at operation 1204, the UE may receive an active link list from the eNB via higher layer signaling. The active link list may support single and/or dual beam operation. The UE may continuously track the set of active links to optimize and update the Rx beams associated with the set of active link. In some embodiments, the active link may be tracked by monitoring aperiodic BRRS signals scheduled in predetermined subframes. An active link can also be optionally associated with a BRS port and a UE may monitor the BRS port.

Subsequent to the reception of the active link list, the UE may receive indications at operation 1206. The indications may include a CSI resource indication and an indication of the associated active link sets the optimal Rx beam or beams associated with the active link for the CSI resource reception. Each CSI resource in the CSI resource indication may point to an active link ID in the active link list. The UE Rx beam configuration may be set to a dual beam configuration if the associated active link ID is part of a dual beam option. In some embodiments, the eNB may indicate an active link in the DCI along with the CSI resource indication.

After having received the indications at operation 1206, the UE may determine the CSI. This is to say that the Rx beam configuration associated with an active link ID may be used for CSI resource reception. The UE may subsequently provide CSI feedback to the eNB at operation 1208. In some embodiments, the UE may receive a BRRS resource indication and an indication of the associated BRS ID. The UE may in response refine a set of UE Rx beams and determine BRRSRP feedback. The BRRSRP feedback may also be provided to the eNB.

Whether or not BRRS feedback is provided to the eNB, the UE may at operation 1210 receive from the eNB serving link information. In single beam operation, the serving link information may indicate a serving link ID as the serving link. Similar to FIG. 11, in some embodiments, as shown by the dashed line in FIG. 12, the designation of serving link can happen immediately after the setup of the active link list, without setting of the Rx beam at operation 1206 or transmission of the CSI feedback at operation 1208. In dual beam operation, the serving link information may indicate a pair of serving link IDs. The serving link information may be provided to the UE using a DCI or MAC control element in subframe n. The UE may set the optimal Rx beam (single beam operation) or beams (dual beam operation) associated with the indicated active link list option for PDCCH and PDSCH reception.

The UE may at operation 1212 subsequently receive control and data from the eNB on a PDCCH and PDSCH.

The PDCCH and PDSCH may use the Rx beam associated with the serving link indicated in operation 1210. The transmissions may occur in subframe n+k, k subframes after reception of the serving link ID(s) at the UE.

EXAMPLES

Example 1 is an apparatus of user equipment (UE) comprising: a memory; and processing circuitry connected with the memory and arranged to: generate a beam reference signal (BRS) receive power (BRSRP) report for transmission to the eNB, the BRSRP report comprising selected BRSRP values and BRS identifiers (IDs) associated with BRSs used to measure the BRSRP values; decode, from the eNB after transmission of the BRSRP report: an active link list comprising a set of active links, a CSI resource indication comprising a CSI resource, and a first active link of the set of active links to be used to measure the CSI resource, selection of the first active link based on the BRSRP report; set a first receive (Rx) beam associated with the first active link, determine a CSI of the CSI resource, and generate CSI feedback for transmission to the eNB indicating the CSI; decode, from the eNB after transmission of the CSI feedback, a serving link ID that indicates a second active link to use for control and data reception, selection of the second active link based on the CSI feedback; and set a second Rx beam associated with the second active link for control and data reception.

In Example 2, the subject matter of Example 1 optionally includes that the processing circuitry is further arranged to: track the BRSs and refine a plurality of Rx beams based on multiple instances of each BRS; receive, from the eNB, selection criteria; and select the BRSRP values based on the selection criteria.

In Example 3, the subject matter of Example 2 optionally includes that the selection criteria comprises selection of highest BRSRP values.

In Example 4, the subject matter of any one or more of Examples 1-3 optionally include that the processing circuitry is further arranged to: continuously track the set of active links to optimize Rx beams associated with the set of active links prior to transmission of the CSI feedback.

In Example 5, the subject matter of Example 4 optionally includes that the set of active links is tracked by use of aperiodic UE-specific Beam Refinement Reference Signals (BRRS) in predetermined subframes.

In Example 6, the subject matter of Example 6 optionally includes that the processing circuitry is further arranged to: monitor BRSs other than BRSs associated with the active link list for mobility and handover purposes.

In Example 7, the subject matter of any one or more of Examples 1-6 optionally include that the processing circuitry is further arranged to: decode, from the eNB, a beam refinement reference signal (BRRS) resource indication that indicates a BRRS and a BRS ID associated with the BRRS; refine a set of Rx beams based on the BRRS; and generate BRRS receive power (BRRSRP) feedback for transmission to the eNB, selection of the second active link based on the BRRSRP feedback.

In Example 8, the subject matter of any one or more of Examples 1-7 optionally include that the second active link is selected to be relatively lightly loaded compared with other active links of the set of active links.

In Example 9, the subject matter of any one or more of Examples 1-8 optionally include that the second active link is selected based on the BRSRP report.

In Example 10, the subject matter of any one or more of Examples 1-9 optionally include that each active link in the set of active links is defined in an information element that includes an active link ID and BRS ID.

In Example 11, the subject matter of any one or more of Examples 1-10 optionally include that the active link list is defined in an information element that includes an active link list ID, a sequence size of the active link list and a list of active link IDs.

In Example 12, the subject matter of any one or more of Examples 1-11 optionally include that a CSI resource configuration that provides the CSI resource indication comprises a CSI resource ID, an active link list ID, and resource element mapping for non-zero and zero power CSI reference signals (CSI-RS), non-zero power RS and intermodulation ratio (IMR), the CSI resource configuration received via a higher layer communications.

In Example 13, the subject matter of Example 12 optionally includes that different CSI resource IDs in different CSI resource configurations point to unique active links.

In Example 14, the subject matter of any one or more of Examples 12-13 optionally include that a CSI resource ID in a first CSI resource configuration points to a same active link as a CSI resource ID in second CSI resource configuration.

In Example 15, the subject matter of any one or more of Examples 1-14 optionally include that the apparatus is configured for dual beam operation such that the BRSRP feedback corresponds to optimal BRSRP value pairs among a set of BRS ID pairs, a pair of serving link IDs is decoded, and dual Rx beams associated with the serving link IDs set for control and data reception.

In Example 16, the subject matter of any one or more of Examples 13-15 optionally include that the active link list indicates a set of BRS IDs based formation of compromise beams that can simultaneously serve multiple UEs.

In Example 17, the subject matter of any one or more of Examples 1-16 optionally include that each active link is associated with a different BRS ID.

In Example 18, the subject matter of any one or more of Examples 1-17 optionally include that the processing circuitry is contained in a baseband circuitry, the baseband circuitry further comprising encoding/decoding circuitry that is configured to decode the serving link ID received in subframe n and control and data signals are received via a serving link associated with the serving link ID in subframe n+k, where k is 8 or 9.

In Example 19, the subject matter of any one or more of Examples 1-18 optionally include, further comprising: an antenna configured to communicate with the eNB.

Example 20 is an apparatus of an evolved NodeB (eNB), the apparatus comprising: a memory; and processing circuitry connected with the memory and arranged to: decode a beam reference signal (BRS) receive power (BRSRP) report from a user equipment (UE), the BRSRP report comprising selected BRSRP values and BRS identifiers (IDs) associated with BRSs used to measure the BRSRP values; generate for transmission to the UE: an active link list based on the BRSRP values and a determination of which of single beam or dual beam operation is supported by the UE, the active link list comprising a set of active links, and a serving link ID that indicates an active link of the set of active links to use for control and data reception in subframe n; and generate at least one of control or data signals for transmission to the UE via a serving link associated with the serving link ID in subframe n+k.

In Example 21, the subject matter of Example 20 optionally includes that the processing circuitry is further arranged to: select an initial active link of the set of active links based on the BRSRP values; and generate, for transmission to the UE, after transmission of the active link list and prior to transmission of the serving link ID: a CSI resource indication comprising a CSI resource, and an initial active link of the set of active links to be used to measure the CSI resource.

In Example 22, the subject matter of Example 21 optionally includes that the processing circuitry is further arranged to: select the active link based on the CSI feedback.

In Example 23, the subject matter of any one or more of Examples 21-22 optionally include that a CSI resource configuration that provides the CSI resource indication comprises a CSI resource ID, an active link list ID, and resource element mapping for non-zero and zero power CSI reference signals (CSI-RS), non-zero power RS and intermodulation ratio (IMR), the CSI resource configuration received via a higher layer communications, and different CSI resource IDs in different CSI resource configurations point to unique active links.

In Example 24, the subject matter of any one or more of Examples 21-23 optionally include that a CSI resource configuration that provides the CSI resource indication comprises a CSI resource ID, an active link list ID, and resource element mapping for non-zero and zero power CSI reference signals (CSI-RS), non-zero power RS and intermodulation ratio (IMR), the CSI resource configuration received via a higher layer communications, and a CSI resource ID in a first CSI resource configuration points to a same active link as a CSI resource ID in second CSI resource configuration.

In Example 25, the subject matter of any one or more of Examples 20-24 optionally include that the processing circuitry is further arranged to: generate, for transmission to the UE, selection criteria for the UE to use to select the BRSRP values.

In Example 26, the subject matter of any one or more of Examples 20-25 optionally include that the processing circuitry is further arranged to: generate, for transmission to the UE, aperiodic UE-specific Beam Refinement Reference Signals (BRRS) in predetermined subframes.

In Example 27, the subject matter of Example 26 optionally includes that the processing circuitry is further arranged to: select the active link based on BRRS receive power (BRRSRP) feedback.

In Example 28, the subject matter of any one or more of Examples 20-27 optionally include that the UE is configured for dual beam operation, the BRSRP feedback corresponds to optimal BRSRP value pairs among a set of BRS ID pairs, a pair of serving link IDs are used for the at least to one of control or data transmission, and dual Rx beams are associated with the serving link IDs for control and data reception.

Example 29 is a computer-readable storage medium that stores instructions for execution by one or more processors of a user equipment (UE), the one or more processors to configure the UE to: measure beam reference signal (BRS) receive power (BRSRP) values associated with BRSs, the BRSs associated with unique BRS identifiers (IDs); select a set of the BRSRP values based on a selection criteria received from an evolved NodeB (eNB); generate a. BRSRP report for transmission to the eNB, the BRSRP report comprising the set of BRSRP values and associated BRS IDs; set a first receive (Rx) beam associated with an initial active link of an active link list received from the eNB, determine a CSI of the initial active link, and generate CSI feedback for transmission to the eNB indicating the CSI; and set a second Rx beam associated with a second active link for at least one of control or data reception from the eNB, a serving link ID.

In Example 30, the subject matter of Example 29 optionally includes that the one or more processors further configure the UE to at least one of: track the BRSs and refine a plurality of Rx beams based on multiple instances of each BRS, or continuously track the set of active links to optimize Rx beams associated with the set of active links prior to transmission of the CSI feedback through aperiodic UE-specific Beam Refinement Reference Signals (BRRS) in predetermined subframes.

In Example 31, the subject matter of any one or more of Examples 29-30 optionally include that the one or more processors further configure the UE to: engage in dual beam operation such that BRSRP feedback supplied to the eNB corresponds to optimal BRSRP value pairs among a set of BRS ID pairs, and dual Rx beams associated with a pair of serving link IDs are set for the at least one of control or data reception.

Example 32 is an apparatus of a user equipment (UE), the apparatus comprising: means for measuring beam reference signal (BRS) receive power (BRSRP) values associated with BRSs, the BRSs associated with unique to BRS identifiers (Ms), means for selecting a set of the BRSRP values based on a selection criteria received from an evolved NodeB (eNB); means for generating a BRSRP report for transmission to the eNB, the BRSRP report comprising the set of BRSRP values and associated BRS IDs; means for setting a first receive (Rx) beam associated with an initial active link of an active link list received from the eNB, determine a CSI of the initial active link, and generate CSI feedback for transmission to the eNB indicating the CSI; and means for setting a second Rx beam associated with a second active link for at least one of control or data reception from the eNB, a serving link ID.

In Example 33, the subject matter of Example 32 optionally includes, further comprising: means for tracking the BRSs and refine a plurality of Rx beams based on multiple instances of each BRS, or means for continuously tracking the set of active links to optimize Rx beams associated with the set of active links prior to transmission of the CSI feedback through aperiodic LE-specific Beam Refinement Reference Signals (BRRS) in predetermined subframes.

In Example 34, the subject matter of any one or more of Examples 32-33 optionally include, further comprising: means for engaging in dual beam operation such that BRSRP feedback supplied to the eNB corresponds to optimal BRSRP value pairs among a set of BRS ID pairs, and dual Rx beams associated with a pair of serving link IDs are set for the at least one of control or data reception.

Example 35 is a method of beam forming for a user equipment (UE), the method comprising: measuring beam reference signal (BRS) receive power (BRSRP) values associated with BRSs, the BRSs associated with unique BRS identifiers (IDs); selecting a set of the BRSRP values based on a selection criteria received from an evolved NodeB (eNB); generating a BRSRP report for transmission to the eNB, the BRSRP report comprising the set of BRSRP values and associated BRS IDs; setting a first receive (Rx) beam associated with an initial active link of an active link list received from the eNB, determine a CSI of the initial active link, and generate CSI feedback for transmission to the eNB indicating the CSI; and setting a second Rx beam associated with a second active link for at least one of control or data reception from the eNB, a serving link ID.

In Example 36, the subject matter of Example 35 optionally includes, further comprising: tracking the BRSs and refine a plurality of Rx beams based on multiple instances of each BRS, or continuously tracking the set of active links to optimize Rx beams associated with the set of active links prior to transmission of the CSI feedback through aperiodic UE-specific Beam Refinement Reference Signals (ERRS) in predetermined subframes.

In Example 37, the subject matter of any one or more of Examples 35-36 optionally include, further comprising: engaging in dual beam operation such that BRSRP feedback supplied to the eNB corresponds to optimal BRSRP value pairs among a set of BRS ID pairs, and dual Rx beams associated with a pair of serving link IDs are set for the at least one of control or data reception.

Example 38 is an apparatus of an evolved NodeB (eNB), the apparatus comprising: means for decoding a beam reference signal (BRS) receive power (BRSRP) report from a user equipment (UE), the BRSRP report comprising selected BRSRP values and BRS identifiers (IDs) associated with BRSs used to measure the BRSRP values; means for generating for transmission to the UE: an active link list based on the BRSRP values and a determination of which of single beam or dual beam operation is supported by the UE, the active link list comprising a set of active links, and a serving link ID that indicates an active link of the set of active links to use for control and data reception in subframe n; and means for generating at least one of control or data signals for transmission to the UE via a serving link associated with the serving link ID in subframe n+k.

In Example 39, the subject matter of Example 38 optionally includes means for selecting an initial active link of the set of active links based on the BRSRP values, and means for generating, for transmission to the UE, after transmission of the active link list and prior to transmission of the serving link ID: a CSI resource indication comprising a CSI resource, and an initial active link of the set of active links to be used to measure the CSI resource.

In Example 40, the subject matter of Example 39 optionally includes means for selecting the active link based on the CSI feedback.

In Example 41, the subject matter of any one or more of Examples 38-40 optionally include that a CSI resource configuration that provides the CSI resource indication comprises a CSI resource ID, an active link list ID, and resource element mapping for non-zero and zero power CSI reference signals (CSI-RS), non-zero power RS and intermodulation ratio (IMR), the CSI resource configuration received via a higher layer communications, and different CSI resource IDs in different CSI resource configurations point to unique active links.

In Example 42, the subject matter of any one or more of Examples 38-41 optionally include that a CSI resource configuration that provides the CSI resource indication comprises a CSI resource ID, an active link list ID, and resource element mapping for non-zero and zero power CSI reference signals (CSI-RS), non-zero power RS and intermodulation ratio (IMR), the CSI resource configuration received via a higher layer communications, and a CSI resource ID in a first CSI resource configuration points to a same active link as a CSI resource ID in second CSI resource configuration.

In Example 43, the subject matter of any one or more of Examples 38-42 optionally include means for generating, for transmission to the UE, selection criteria for the UE to use to select the BRSRP values.

In Example 44, the subject matter of any one or more of Examples 38-43 optionally include means for generating, for transmission to the UE, aperiodic UE; specific Beam Refinement Reference Signals (BRRS) in predetermined subframes.

In Example 45, the subject matter of Example 44 optionally includes means for selecting the active link based on BRRS receive power (BRRSRP) feedback.

In Example 46, the subject matter of any one or more of Examples 38-45 optionally include that the UE is configured for dual beam operation, the BRSRP feedback corresponds to optimal BRSRP value pairs among a set of BRS ID pairs, a pair of serving link IDs are used for the at least one of control or data transmission, and dual Rx beams are associated with the serving link IDs for control and data reception.

Example 47 is a computer-readable storage medium that stores instructions for execution by one or more processors of an evolved NodeB (eNB), the one or more processors to configure the eNB to: decode a beam reference signal (BRS) receive power (BRSRP) report from a user equipment (UE), the BRSRP report comprising selected BRSRP values and BRS identifiers (IDs) associated with BRSs used to measure the BRSRP values; generate for transmission to the UE: an active link list based on the BRSRP values and a determination of which of single beam or dual beam operation is supported by the UE, the active link list comprising a set of active links, and a serving link ID that indicates an active link of the set of active links to use for control and data reception in subframe n; and generate at least one of control or data signals for transmission to the UE via a serving link associated with the serving link ID in subframe n+k.

In Example 48, the subject matter of Example 47 optionally includes that the one or more processors further configure the eNB to: select an initial active link of the set of active links based on the BRSRP values; and generate, for transmission to the UE, after transmission of the active link list and prior to transmission of the serving link ID: a CSI resource indication comprising a CSI resource, and an initial active link of the set of active links to be used to measure the CSI resource.

In Example 49, the subject matter of Example 48 optionally includes that the one or more processors further configure the eNB to: select the active link based on the CSI feedback.

In Example 50, the subject matter of any one or more of Examples 47-49 optionally include that a CSI resource configuration that provides the CSI resource indication comprises a CSI resource ID, an active link list ID, and resource element mapping for non-zero and zero power CSI reference signals (CSI-RS), non-zero power RS and intermodulation ratio (IMR), the CSI resource configuration received via a higher layer communications, and different CSI resource IDs in different CSI resource configurations point to unique active links.

In Example 51, the subject matter of any one or more of Examples 47-50 optionally include that a CSI resource configuration that provides the CSI resource indication comprises a CSI resource ID, an active link list ID, and resource element mapping for non-zero and zero power CSI reference signals (CSI-RS), non-zero power RS and intermodulation ratio (IMR), the CSI resource configuration received via a higher layer communications, and a CSI resource ID in a first CSI resource configuration points to a same active link as a CSI resource IL) in second CSI resource configuration.

In Example 52, the subject matter of any one or more of Examples 47-51 optionally include that the one or more processors further configure the eNB to: generate, for transmission to the UE, selection criteria for the UE to use to select the BRSRP values.

In Example 53, the subject matter of any one or more of Examples 47-52 optionally include that the one or more processors further configure the eNB to: generate, for transmission to the UE, aperiodic UE-specific Beam Refinement Reference Signals (BRRS) in predetermined subframes.

In Example 54, the subject matter of Example 53 optionally includes that the one or more processors further configure the eNB to: select active link based on BRRS receive power (BRRSRP) feedback.

In Example 55, the subject matter of any one or more of Examples 47-54 optionally include that the UE is configured for dual beam operation, the BRSRP feedback corresponds to optimal BRSRP value pairs among a set of BRS ID pairs, a pair of serving link IDs are used for the at least one of control or data transmission, and dual Rx beams are associated with the serving link IDs for control and data reception.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the is terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus of user equipment (UE) comprising:
a memory; and
processing circuitry connected with the memory and arranged to:
generate a beam reference signal (BRS) receive power (BRSRP) report for transmission to the eNB, the BRSRP report comprising selected BRSRP values and BRS identifiers (IDs) associated with BRSs used to measure the BRSRP values;
decode, from the eNB after transmission of the BRSRP report:
an active link list comprising a set of active links,
a CSI resource indication comprising a CSI resource, and
a first active link of the set of active links to be used to measure the CSI resource, selection of the first active link based on the BRSRP report;
set a first receive (Rx) beam associated with the first active link, determine a CSI of the CSI resource, and generate CSI feedback for transmission to the eNB indicating the CSI;
decode, from the eNB after transmission of the CSI feedback, a serving link ID that indicates a second active link to use for control and data reception, selection of the second active link based on the CSI feedback; and
set a second Rx beam associated with the second active link for control and data reception.

2. The apparatus of claim 1, wherein the processing circuitry is further arranged to:
track the BRSs and refine a plurality of Rx beams based on multiple instances of each BRS;
receive, from the eNB selection criteria; and
select the BRSRP values based on the selection criteria.

3. The apparatus of claim 2, wherein:
the selection criteria comprises selection of highest BRSRP values.

4. The apparatus of claim 1, wherein the processing circuitry is further arranged to:
continuously track the set of active links to optimize Rx beams associated with the set of active links prior to transmission of the CSI feedback.

5. The apparatus of claim 4, wherein:
the set of active links is tracked by use of aperiodic UE-specific Beam Refinement Reference Signals (BRRS) in predetermined subframes.

6. The apparatus of claim 1, wherein the processing circuitry is further arranged to:
monitor BRSs other than BRSs associated with the active link list for mobility and handover purposes.

7. The apparatus of claim 1, wherein the processing circuitry is further arranged to:
decode, from the eNB, a beam refinement reference signal (BRRS) resource indication that indicates a BRRS and a BRS ID associated with the BRRS;
refine a set of Rx beams based on the BRRS; and
generate BRRS receive power (BRRSRP) feedback for transmission to the eNB, selection of the second active link based on the BRRSRP feedback.

8. The apparatus of claim 1, wherein:
the second active link is selected to be relatively lightly loaded compared with other active links of the set of active links.

9. The apparatus of claim 1, wherein:
the second active link is selected based on the BRSRP report.

10. The apparatus of claim 1, wherein:
each active link in the set of active links is defined in an information element that includes an active link ID and BRS ID.

11. The apparatus of claim 1, wherein:
the active link list is defined in an information element that includes an active link list ID, a sequence size of the active link list and a list of active link IDs.

12. The apparatus of claim 1, wherein:
a CSI resource configuration that provides the CSI resource indication comprises a CSI resource ID, an active link list ID, and resource element mapping for non-zero and zero power CSI reference signals (CSI-RS), non-zero power RS and intermodulation ratio (IMR), the CSI resource configuration received via a higher layer communications.

13. The apparatus of claim 12, wherein:
different CSI resource IDs in different CSI resource configurations point to unique active links.

14. The apparatus of claim 12, wherein:
a CSI resource ID in a first CSI resource configuration points to a same active link as a CSI resource ID in second CSI resource configuration.

15. The apparatus of claim 1, wherein:
the apparatus is configured for dual beam operation such that the BRSRP feedback corresponds to optimal BRSRP value pairs among a set of BRS ID pairs, a pair of serving link IDs is decoded, and dual Rx beams associated with the serving link IDs set for control and data reception.

16. The apparatus of claim 13, wherein:
the active link list indicates a set of BRS IDs for formation of compromise beams that can simultaneously serve multiple UEs.

17. The apparatus of claim 1, wherein:
each active link is associated with a different BRS ID.

18. The apparatus of claim 1, wherein:
the processing circuitry is contained in a baseband circuitry, the baseband circuitry further comprising encoding/decoding circuitry that is configured to decode the serving link ID received in subframe n and control and data signals are received via a serving link associated with the serving link ID in subframe n+k, where k is 8 or 9.

19. The apparatus of claim 1, further comprising:
an antenna configured to communicate with the eNB.

20. An apparatus of an evolved NodeB (eNB), the apparatus comprising:
a memory; and
processing circuitry connected with the memory and arranged to:
decode a beam reference signal (BRS) receive power (BRSRP) report from a user equipment (UE), the BRSRP report comprising selected BRSRP values and BRS identifiers (IDs) associated with BRSs used to measure the BRSRP values;
generate for transmission to the UE:
an active link list based on the BRSRP values and a determination of which of single beam or dual beam operation is supported by the UE, the active link list comprising a set of active links, and
a serving link ID that indicates an active link of the set of active links to use for control and data reception in subframe n; and
generate at least one of control or data signals for transmission to the UE via a serving link associated with the serving link ID in subframe n+k.

21. The apparatus of claim 20, wherein the processing circuitry is further arranged to:
select an initial active link of the set of active links based on the BRSRP values; and
generate, for transmission to the UE, after transmission of the active link list and prior to transmission of the serving link ID:
a CSI resource indication comprising a CSI resource, and an initial active link of the set of active links to be used to measure the CSI resource.

22. The apparatus of claim 21, wherein the processing circuitry is further arranged to:
select the active link based on the CSI feedback.

23. The apparatus of claim 21, wherein:
a CSI resource configuration that provides the CSI resource indication comprises a CSI resource ID, an active link list ID, and resource element mapping for non-zero and zero power CSI reference signals (CSI-RS), non-zero power RS and intermodulation ratio (IMR), the CSI resource configuration received via a higher layer communication, and
different CSI resource IDs in different CSI resource configurations point to unique active links.

24. The apparatus of claim 21, wherein:
a CSI resource configuration that provides the CSI resource indication comprises a CSI resource ID, an active link list ID, and resource element mapping for non-zero and zero power CSI reference signals (CSI-RS), non-zero power RS and intermodulation ratio (IMR), the CSI resource configuration received via a higher layer communication, and
a CSI resource ID in a first CSI resource configuration points to a same active link as a CSI resource ID in second CSI resource configuration.

25. The apparatus of any one or more of claim 20, wherein the processing circuitry is further arranged to:
generate, for transmission to the UE, selection criteria for the UE to use to select the BRSRP values.

26. The apparatus of any one or more of claim 20, wherein the processing circuitry is further arranged to:

generate, for transmission to the UE, aperiodic UE-specific Beam Refinement Reference Signals (BRRS) in predetermined subframes.

27. The apparatus of claim 26, wherein the processing circuitry is further arranged to:
select the active link based on BRRS receive power (BRRSRP) feedback.

28. The apparatus of claim 20, wherein:
the BRSRP feedback corresponds to optimal BRSRP value pairs among a set of BRS ID pairs, a pair of serving link IDs are used for the at least one of control or data transmission, and dual Rx beams are associated with the serving link IDs for control and data reception.

29. A non-transitory computer-readable storage medium that stores instructions for execution by one or more processors of a user equipment (UE), the one or more processors to configure the UE to:
measure beam reference signal (BRS) receive power (BRSRP) values associated with BRSs, the BRSs associated with unique BRS identifiers (IDs);
select a set of the BRSRP values based on selection criteria received from an evolved NodeB (eNB);
generate a BRSRP report for transmission to the eNB, the BRSRP report comprising the set of BRSRP values and associated BRS IDs;
set a first receive (Rx) beam associated with an initial active link of an active link list received from the eNB, determine a CSI of the initial active link, and generate CSI feedback for transmission to the eNB indicating the CSI;
set a second Rx beam associated with a second active link for at least one of control or data reception from the eNB, a serving link ID; and
at least one of track the BRSs and refine a plurality of Rx beams based on multiple instances of each BRS or continuously track the set of active links to optimize Rx beams associated with the set of active links prior to transmission of the CSI feedback through aperiodic UE-specific Beam Refinement Reference Signals (BRRS) in predetermined subframes.

30. The medium of claim 29, wherein the one or more processors further configure the UE to:
engage in dual beam operation such that BRSRP feedback supplied to the eNB corresponds to optimal BRSRP value pairs among a set of BRS ID pairs, and dual Rx beams associated with a pair of serving link IDs are set for the at least one of control or data reception.

31. The medium of claim 29, wherein:
the selection criteria comprises selection of highest BRSRP values.

* * * * *